United States Patent
Naksen et al.

(10) Patent No.: US 7,558,057 B1
(45) Date of Patent: Jul. 7, 2009

(54) PERSONAL DIGITAL DEVICE WITH ADJUSTABLE INTERFACE

(76) Inventors: Alex Naksen, 142-15 26$^{th}$ Ave., Apt. 2H, New York, NY (US) 11354; Dennis Naksen, 142-15 26$^{th}$ Ave., Apt. 2H, New York, NY (US) 11354

( * ) Notice: Subject to any disclaimer, the term of this patent is extended or adjusted under 35 U.S.C. 154(b) by 311 days.

(21) Appl. No.: 11/145,793

(22) Filed: Jun. 6, 2005

(51) Int. Cl.
*H05K 5/00* (2006.01)
*H05K 7/00* (2006.01)
*H04M 1/00* (2006.01)

(52) U.S. Cl. .............. 361/679.56; 361/679.3; 361/679.4; 455/575.1

(58) Field of Classification Search .......... 455/575.1; 361/679.56, 679.4, 679.3
See application file for complete search history.

(56) References Cited

U.S. PATENT DOCUMENTS

| | | | |
|---|---|---|---|
| 5,305,181 A | 4/1994 | Schultz | |
| 5,590,417 A | 12/1996 | Rydbeck | |
| 5,881,149 A * | 3/1999 | Weatherill | 379/433.02 |
| 5,931,764 A | 8/1999 | Freeman et al. | |
| 6,035,035 A | 3/2000 | Firooz | |
| 6,212,414 B1 | 4/2001 | Alameh et al. | |
| 6,229,514 B1 * | 5/2001 | Larson | 345/101 |
| 6,311,076 B1 | 10/2001 | Peuhu et al. | |
| 6,377,324 B1 | 4/2002 | Katsura | |
| 6,529,713 B1 | 3/2003 | Seymour | |
| 6,535,376 B2 | 3/2003 | Fujita et al. | |
| 6,577,496 B1 | 6/2003 | Gioscia et al. | |
| 6,671,011 B1 | 12/2003 | Zhang et al. | |
| 6,771,232 B2 | 8/2004 | Fujieda et al. | |
| 6,873,315 B2 | 3/2005 | Hemia et al. | |
| 2001/0036266 A1 | 11/2001 | Gronroos et al. | |
| 2003/0160735 A1 | 8/2003 | Lee et al. | |
| 2004/0055811 A1 * | 3/2004 | Shih | 181/129 |

* cited by examiner

*Primary Examiner*—Jayprakash N Gandhi
*Assistant Examiner*—Anthony M Haughton

(57) ABSTRACT

A personal digital device comprises a variable stiffness screen capable of varying its display size by managing its stiffness, and a body carrying means for wireless communication and for storing and processing information. The functional flexibility of the screen allows for creating an adjustable visual interface between the user and the device: with the screen inside the device for compact storage, and with the screen extended to display high-quality graphics and images. In some particular embodiments the device incorporates a detachable audio unit allowing configuration of the user audio interface depending on the specifics of usage.

3 Claims, 31 Drawing Sheets

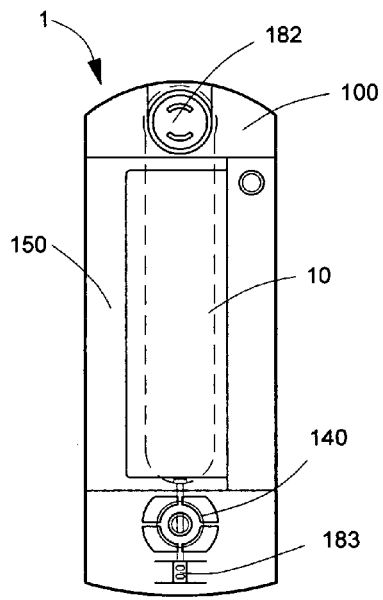
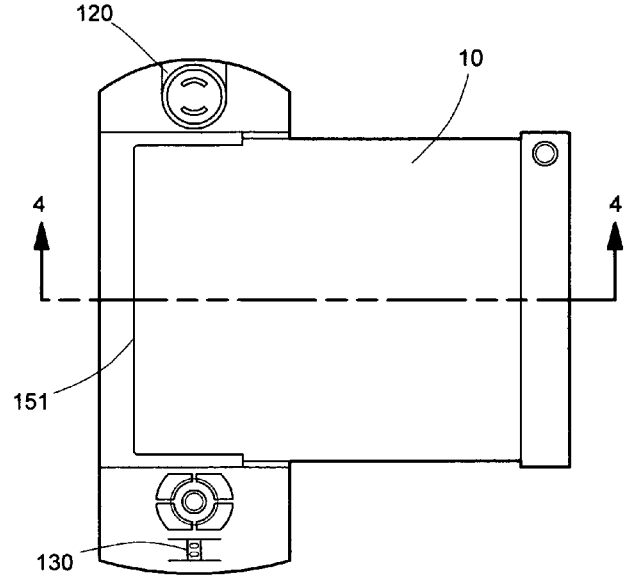
FIG. 2  FIG. 3
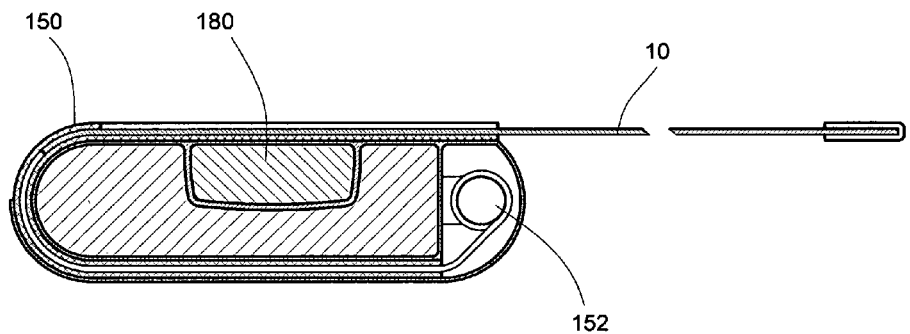
FIG. 4

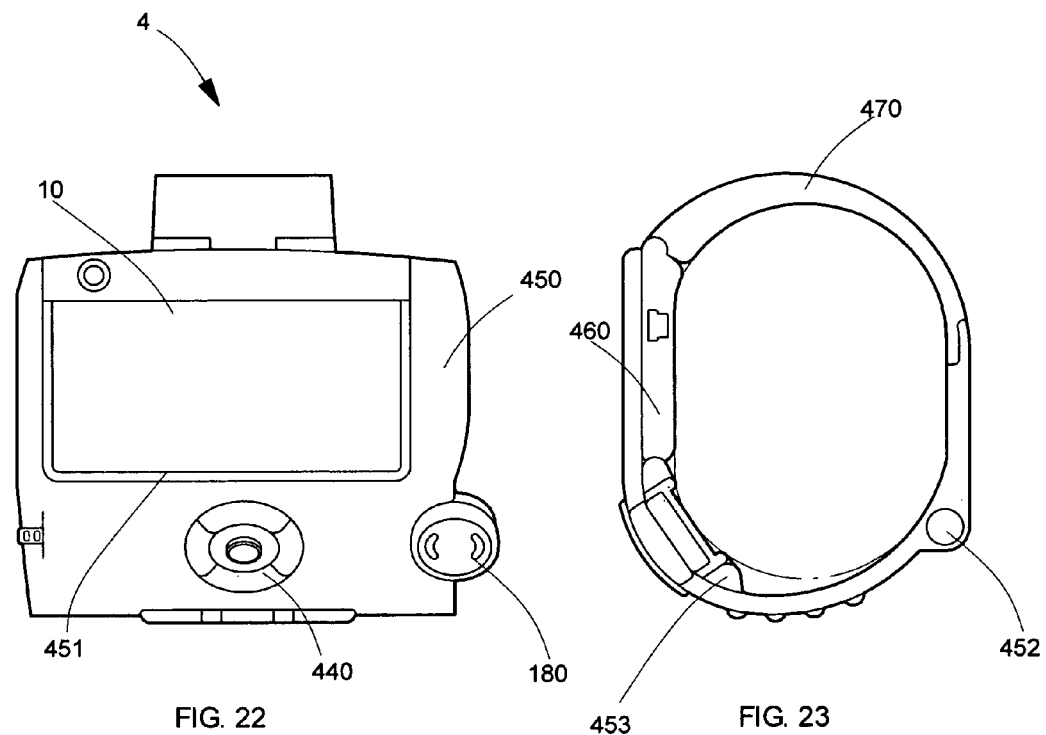
FIG. 22
FIG. 23
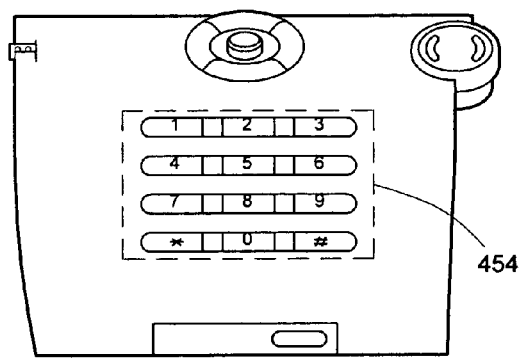
FIG. 24

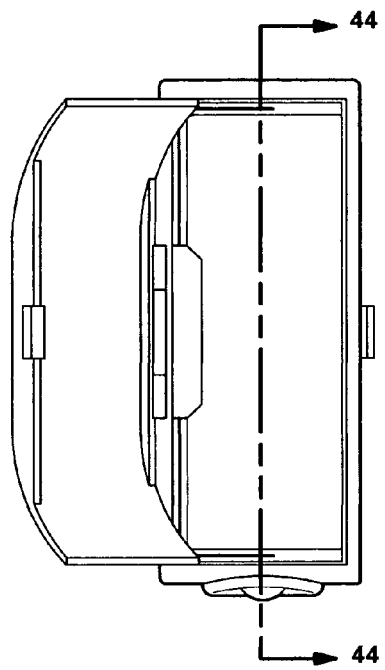
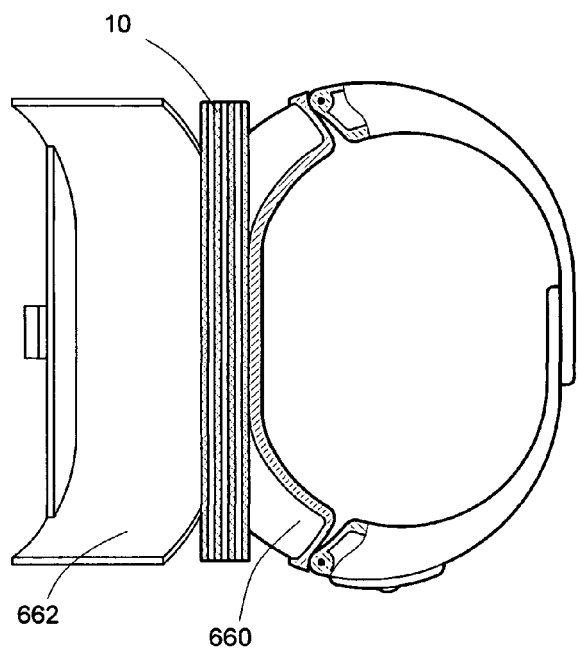
FIG. 43
FIG. 44
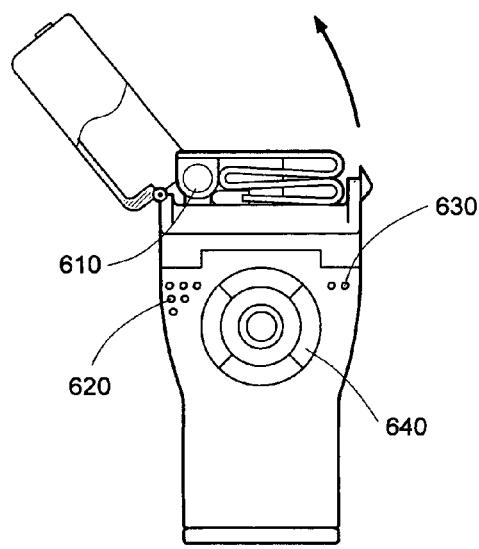
FIG. 45

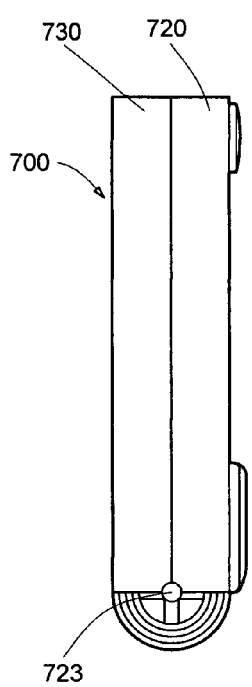 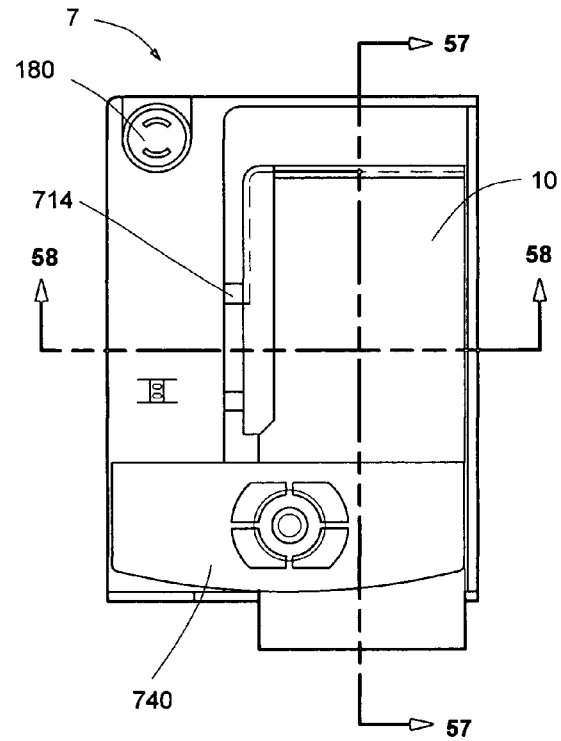 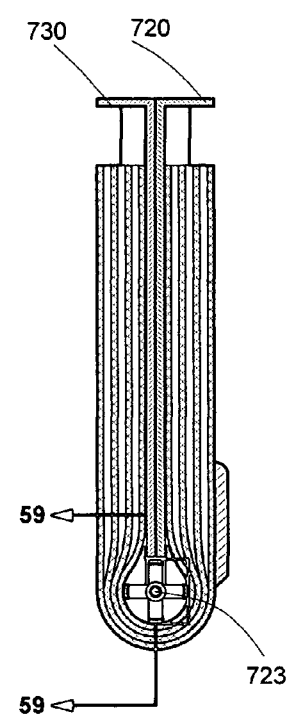
FIG. 55　　　　　FIG. 56　　　　　FIG. 57
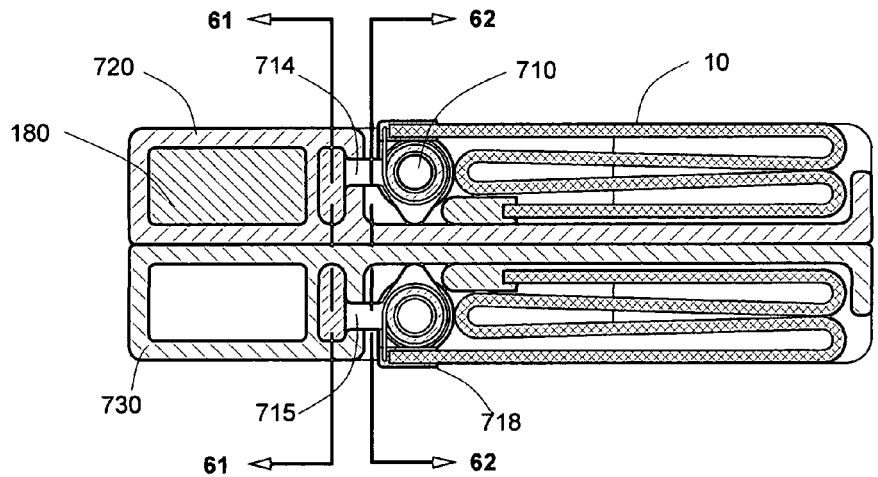
FIG. 58

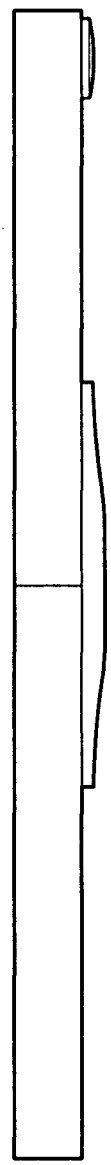
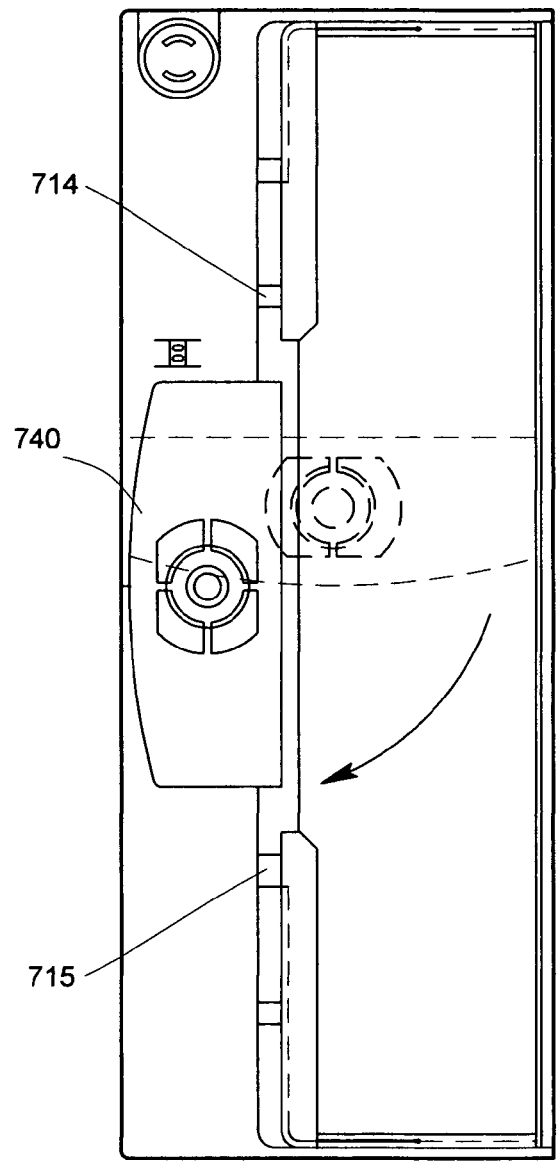
FIG. 63                                  FIG. 64
FIG. 65

PERSONAL DIGITAL DEVICE WITH ADJUSTABLE INTERFACE

CROSS-REFERENCE TO RELATED APPLICATIONS

The present application is related to U.S. patent application Ser. No. 10/921,601 entitled VARIABLE STIFFNESS SCREEN, and proposed by the same inventors as of the present application and which is herein incorporated by reference

STATEMENT REGARDING FEDERALLY SPONSORED RESEARCH OR DEVELOPMENT

"Not Applicable"

REFERENCE TO A SEQUENCE LISTING, A TABLE, OR A COMPUTER PROGRAM LISTING COMPACT DISC APPENDIX

"Not Applicable"

BACKGROUND OF INVENTION

This invention relates to electronic communications and processing devices and more particularly to devices having displays, which sizes can be adjusted depending on the user's needs.

Mobile and wearable communication devices are becoming increasingly popular, due in part to the dramatic miniaturization of such devices, which has occurred over the past decade. Often times these devices utilize a combination of different functions, for instance such gadgets as a multifunctional watch, a cellular phone/organizer, and a hand-held computer/PDA.

There is an intrinsic contradiction between the miniaturization of the mobile and wearable electronic devices accompanied by the increasing flow of visual information and the practically unchanged human abilities to receive this information by the eye. An electronic display significantly affects the weight and design of mobile devices. The hand-held computer/PDAs are equipped with rather readable displays, but their sheer bulk and rigid shape become insuperable obstacles to using them in situations, when the size and way of carrying matter.

It may become the main hurdle to full realization of the immensely potent high-speed "third generation", or 3G, cellular systems. We think there is a better way to have instant access to information while connecting people on the move. In our view, the means by which the user interacts with the device, along with the way of presenting information define the visual user interface, and thus the accessibility of information.

Implementation of the currently developing ultra-thin flexible electronic display film technology opens a way to comply with the requirements of portability and comfort of use. There are some instances where a flexible display becomes the defining core of a mobile/wearable device.

The wearable device with flexible display is disclosed in U.S. Pat. No. 5,931,764 to Freeman et al. The device comfortably conforms to a wearer's body and can undergo flexing of the type and magnitude experienced by a wristwatch or other wearable devices. The flexible body includes an integrated circuit, a flexible display element, and circuitry for controlling the display element. The curvilinear display allows to read visual information presented in a discrete form, similar to that of a wristwatch. The more display is bent, the less information can be read at a glance. This limits presentation of information to a sequence of relatively small chunks of it, without having the whole picture on the screen.

The mobile communication device, which is built around a flexible display, is disclosed in U.S. Pat. No. 6,311,076 B1 to Peuhu et al. The display is movable between a retracted position within the cylindrical housing and an extended position, where the display is visible to the user. In the extended mode, an antenna in its unfolded position, i.e. extended perpendicularly to the device's housing, supports the flexible display. This approach to support the flexible display limits the ways of holding the device to virtually only one position, when the device is vertically oriented with a horizontally extended display. In any other position the screen's planar geometry, being supported only partially, would be seriously impaired, making displayed information rather unreadable. Secondly, it requires a few separate moves for making this system work, including extension of the display, unfolding of the antenna and snapping of the display to it.

The mobile terminal device, content distribution system, content distribution method, and program for executing method thereof, is disclosed in U.S. Pat. No. 6,771,232 B2 to Fujieda et al. The main element of the terminal is a flexible display, which can be extended by means of a supporting foldable arm. The use of a mechanical apparatus requires having an initially quite firm and stable flexible display, and, most importantly, it supports the screen in one particular way, for instance not allowing for folding the screen in two directions perpendicular to each other in order to substantially increase the screen's viewable area.

Summarizing, some important problems associated with either mobile or wearable electronic devices in regards to presentation of visual information can be identified as follows:

Miniaturization of mobile and wearable electronic devices is limited by the size of an electronic display, which has to be large enough to provide readable visual information. A technologically achievable much greater volume of visual information is also limited by the display size. The great potential of 3G cellular systems could not be fully realized, due to the relatively small conventional LCD display. The apparent limitation of the display size is the device's body itself.

Implementation of the flexible display technology could solve the aforementioned problem if the screen could be adjusted depending on the specifics of usage. Firstly, the display size has to be quite small to fit in the device's body for compact storage and when the volume of information is relatively low. Secondly, the display has to be sufficiently large to enable viewing of high-quality graphics and images associated with 3G technologies. Therefore, accepting the hand-held/PDA format as a generally adopted benchmark, it can be specified that the display of a mobile device has to be comparable in viewable size to that of a handheld's display. The use of an even greater display size allows transformation of a rather small mobile device into a much larger portable device, a tablet computer, for instance.

The virtue of flexibility, which allows creating of an adjustable video user interface, becomes a liability, when the flexible screen is in an extended position. In this position the flexible display is structurally unstable, thus preventing reading of the displayed information. Therefore the flexible display in its extended position needs to be supported in a way making it firm and stable. An external support in the form of a mechanical apparatus limits the options for extension of the screen to only one particular method. It would substantially decrease the value of a mobile device equipped with the flexible screen as a universally used medium.

A wearable device with the flexible display could comfortably conform to a wearer's body, and to the wrist, in particular. At the same time, the display's curvilinear geometry limits the ways of presenting information to a sequence of relatively small pieces of data lacking the versatility of having high-quality graphics and images on the screen.

Dealing with significant volumes of visual information, which becomes possible due to large enough flexible displays, often demands working while using both hands, one to hold the device and the other to operate it. Correspondingly, simultaneous handling of audio and video information necessitates employment of a separate audio piece that allows hands-free communication.

BRIEF SUMMARY OF THE INVENTION

Accordingly, it is an object of this invention to solve the problems created by the miniaturization of wearable electronic devices accompanied by the increasing flow of visual information, while the human abilities to receive this information via the eye remain practically unchanged. More specifically, it is an object of the present invention to provide a personal/mobile digital device with an adjustable interface allowing the user to operate simultaneously with a variety of information in a precise, quick and comfortable manner.

There are virtually an infinite number of situations, when people on the go need to access information. In our view, to address this problem, a variety of wearable multifunctional digital devices can be built around the innovative Variable Stiffness Screen. This invention is described in patent application Ser. No. 10/921,601 of Aug. 19, 2004. The proposed screen is able to change its stiffness, and correspondingly, its size from the watch-like readout to the PDA display depending on the volume of information and, ultimately on the user's needs.

The proposed device could combine the functions of communication and organization. The use of extension cards would transform it into a GPS navigator, MP3 player and so forth. The device wirelessly connects the user to the cellular networks and World Wide Web, and also allows management of personal information similarly to that of hand-held computers/PDAs.

The variable stiffness screen's functional flexibility allows for creating a desirable visual interface between the user and the object, providing viewing of high-quality graphics and images comparable in viewable size to that of a hand-held computer's display. This level of information presentation is hardly achievable on cellular phones and wrist-worn devices by the existing means.

The immediate accessibility and adjustability of this digital device defines this invention. By providing the proposed flexible audio and video user interfaces it could transform the existing archetypes of wearable electronic devices into user-centered products that can adjust themselves rapidly to different requirements.

Therefore several objects and advantages of the present invention are:

The personal digital device of this invention is equipped with the variable stiffness screen that is considerably larger than the device itself, thus changing the existing relationship paradigm between the display and the device itself. Therefore the miniaturization of mobile and wearable electronic devices would no longer be limited by the size of a built-in display.

The proposed personal digital device is rather small to accompany unobtrusively the user in all his/her activities and, nonetheless, its screen is large enough to display Internet content and multimedia applications comfortably and strain-free on the eyes. To satisfy these quite contradictory requirements the digital device functions in two basic working modes. Firstly, the display fits inside the device's body for compact storage and when the volume of information is relatively low. Secondly, the display in an extended mode provides viewing of high-quality graphics and images comparable in viewable size to that of a hand-held computer's display.

The personal digital device of this invention provides the variable stiffness screen that is firm and stable in the extended mode. Its structural stability allows for displaying diverse video information, as well as for being used as a touch screen. The present invention provides the means to increase the viewable area of a fully open screen to such en extent that a small mobile electronic device could be transformed into a much larger portable device, a tablet computer, for instance.

The personal digital device with the variable stiffness screen can be mounted on the user's arm similarly to that of a conventional wristwatch. At the same time, unlike wrist-worn devices, the digital device of this invention provides displaying of the volumes of visual information on its fully extended flat screen akin to those of many hand-held devices.

The proposed personal digital device has a flexible architecture with a detachable audio unit. It allows the wearer to configure the audio user interface depending on the specifics of usage. The unit's separate configuration provides simultaneous handling of video and audio information in addition to the common advantages of hands-free communication.

Further objects and advantages will become apparent from a consideration of the ensuing description and drawings.

SUMMARY

In accordance to the present invention, a personal digital device with an adjustable interface comprises the variable stiffness screen having the ability to change its display size by controlling its stiffness, and a body encasing the means for wireless communication and storing and processing information; therefore the viewable area of the screen can be adjusted based on the volume of visual information, and correspondingly on the user's needs. In the preferred embodiments the device's audio unit performs either as an integral part of the body, serving as its speaker and microphone, or as an earpiece being worn on the user's ear to provide simultaneous handling of video and audio information, as well as hands-free communication.

BRIEF DESCRIPTION OF THE SEVERAL VIEWS OF THE DRAWING

Drawing Figures

The invention will be more readily understood with reference to the accompanying drawings, wherein:

FIG. 2 shows a front view of the hand-held digital device in the closed mode.

FIG. 3 shows a front view of the hand-held digital device in the open mode.

FIG. 4 shows a sectional view taken along section line 4-4 of FIG. 3.

FIG. 22 shows a top view of the articulated wrist-worn digital device in the closed mode.

FIG. 23 shows a right side view of the articulated wrist-worn digital device.

FIG. 24 shows a front view of the articulated wrist-worn digital device.

FIG. 43 shows a top view of the wrist-worn digital device with the foldable screen when the cover is open and the screen edges are straightened.

FIG. 44 shows a sectional view taken along section line 44-44 of FIG. 43 when the cover is open and the screen edges are straightened.

FIG. 45 shows a front view of the wrist-worn digital device with the foldable screen when the cover is open and the screen edges are straightened.

FIG. 55 shows a side view of the hand-held digital device with the foldable screen.

FIG. 56 shows a front view of the hand-held digital device with the foldable screen.

FIG. 57 shows a sectional view taken along section line 57-57 of FIG. 56.

FIG. 58 shows an enlarged sectional view taken along section line 58-58 of FIG. 56.

FIG. 63 shows a side view of the unfolded hand-held digital device with the foldable screen.

FIG. 64 shows a front view of the unfolded hand-held digital device with the foldable screen.

FIG. 65 shows a top view of the unfolded hand-held digital device with the foldable screen with broken-out section.

REFERENCE NUMERAL IN DRAWINGS

1 Hand-held digital device

Figure 1:
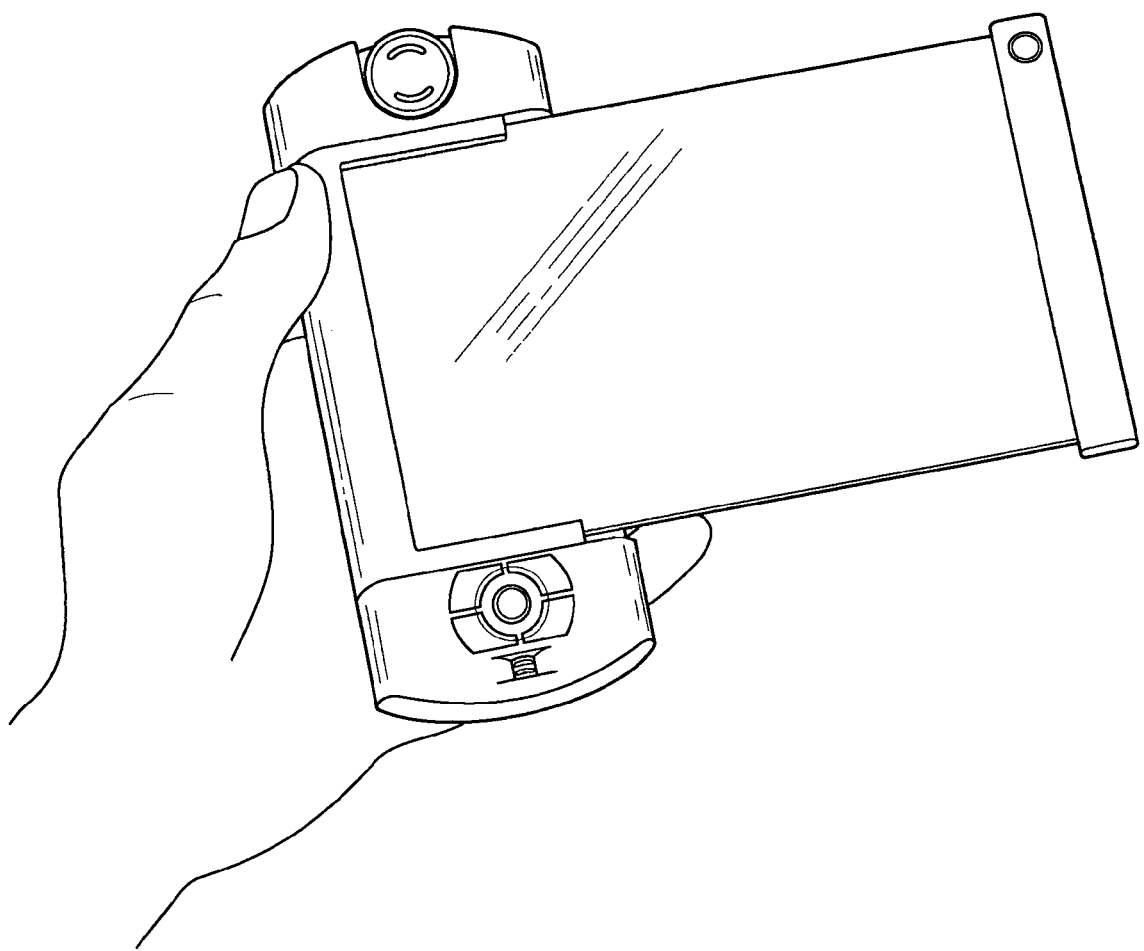
FIG. 1 shows an overall perspective view of the hand-held digital device.

| | | | |
|---|---|---|---|
| 10 | variable stiffness screen | | |
| 100 | body | | |
| 110 | holder | 114 | internal stop |
| 120 | acoustical opening | | |
| 130 | acoustical duct | | |
| 140 | control panel | | |
| 150 | flat sleeve | 151 | opening |
| | | 152 | pullback winding mechanism |
| 180 | audio unit | 181 | earhook |
| | | 182 | speaker |
| | | 183 | microphone |
| | | 184 | toothbelt |
| | | 185 | reel |
| | | 186 | button |

2 Sliding hand-held digital device

| | | | |
|---|---|---|---|
| 10 | variable stiffness screen | | |
| 200 | body | | |
| 220 | upper part | 222 | casing element |
| | | 224 | pullback winding mechanism |
| 230 | lower part | 232 | recessed area |
| | | 231 | alphanumeric keypad |
| 240 | control panel | | |
| 270 | compression spring | 272 | release button |

3 Folding hand-held digital device

| | | | |
|---|---|---|---|
| 10 | variable stiffness screen | | |
| 300 | body | | |
| 340 | control panel | 341 | alphanumeric keypad |
| 360 | enclosure | 361 | opening |
| | | 362 | pullback winding mechanism |

4 Articulated wrist-worn digital device

| | | | |
|---|---|---|---|
| 10 | variable stiffness screen | | |
| 180 | audio unit | | |
| 400 | body | | |
| 440 | control panel | | |
| 450 | flat sleeve | 451 | opening |
| | | 452 | pullback winding mechanism |
| | | 453 | hinge element |
| | | 454 | alphanumeric keypad |
| 460 | top part | 462 | lower housing |
| | | 463 | resilient sidewall |
| | | 464 | upper housing |
| | | 465 | cylindrical protrusion |
| | | 466 | cover |
| 470 | rear part | | |
| 480 | holder | 481 | hinge element |
| | | 482 | connecting member |

5 Sliding wrist-worn digital device

| | | | |
|---|---|---|---|
| 10 | variable stiffness screen | | |
| 180 | audio unit | | |
| 500 | body | | |
| 560 | top part | 564 | groove |
| | | 566 | left recess |
| | | 568 | right recess |
| 570 | rear part | | |
| 580 | front part | | |
| 540 | control panel | | |
| 550 | enclosure | 551 | opening |

-continued

| | | | |
|---|---|---|---|
| | | 552 | pullback winding mechanism |
| | | 553 | flat portion |
| | | 554 | cylindrical portion |
| | | 556 | left detent |
| | | 558 | right detent |

6 Wrist-worn digital device with foldable screen

| | | | |
|---|---|---|---|
| 10 | variable stiffness screen | | |
| 600 | body | 601 | permanent viewable area |
| | | 602 | cover |
| | | 603 | latch |
| 610 | pullback winding mechanism | 612 | elongated drum |
| | | 613 | coil spring |
| | | 614 | support |
| | | 615 | upper cable |
| | | 616 | lower cable |
| | | 617 | upper edge member |
| | | 618 | lower edge member |
| | | 619 | cutout |
| 620 | speaker | | |
| 630 | microphone | | |
| 640 | control panel | | |

7 Hand-held digital device with foldable screen

| | | | |
|---|---|---|---|
| 10 | variable stiffness screen | 12 | handle |
| 180 | audio unit | | |
| 700 | body | | |
| 710 | pullback winding mechanism | 714 | upper bracket |
| | | 715 | lower bracket |
| | | 718 | edge member |
| 720 | upper housing | 722 | hinge part |
| | | 723 | hinge mechanism |
| | | 724 | upper guiding channel |
| | | 726 | spring |
| 730 | lower housing | 732 | hinge part |
| | | 734 | lower guiding channel |
| 740 | control module | | |
| 750 | tubular guide member | 752 | linear element |
| | | 753 | groove |
| | | 754 | protruding element |
| | | 755 | hinge axle |
| | | 756 | rib |

DETAILED DESCRIPTION OF THE INVENTION

The proposed personal digital device is built around the variable stiffness screen, which is enabled to change the display size by managing its stiffness, as it is disclosed in U.S. Patent Application for the Variable Stiffness Screen Ser. No. 10/921,601, and proposed by the same inventors as of the present application and which is herein incorporated by reference. In all its embodiments the variable stiffness screen incorporates a flexible display attached to a structural support system.

The screen can be connected to the body either directly or by the use of a carrying member containing said screen, where the carrying member includes means for connecting an embedded electrical circuitry and a pullback winding mechanism. In some embodiments the carrying member is a flexible flat sleeve with a rectangular opening revealing a respective part of the display. In the other embodiments the carrying member is a rigid enclosure comprising a flat portion with a rectangular opening and an adjacent cylindrical portion housing a rolled-up part of the screen. Also the screen can be enclosed in a double-wall tubular casing element, and the screen is moveably sandwiched between the casing's walls. In the alternative embodiments the screen is directly attached to a corresponding body and can be folded for compact storage and unfolded to make the display fully visible to the user.

The screen functions in two working modes: closed and open. In a closed mode the screen is pliable and placed inside the carrying member. The screen's upper part is exposed through an opening in the carrying member, thus creating the display's permanent viewable area. It allows to use the screen while it's folded or bent, when the volume of visual information is relatively low. In this mode a deactivated support system is hidden inside the carrying member, therefore structurally the screen remains practically the same for all the embodiments. In an open mode the screen is pulled out of the carrying member and its entire viewable area can be used to display a corresponding volume of visual information. An activated support system provides the necessary firmness and rigidity to the screen in this position. The screen returns to the closed mode automatically, when the support system is deactivated.

To satisfy a multitude of user needs this digital device is proposed in seven embodiments varying in specific ways and means to carry and access it: a hand-held digital device, a sliding hand-held digital device, a folding hand-held digital device, an articulated wrist-worn digital device, a sliding wrist-worn digital device, a wrist-worn digital device with a foldable screen and a hand-held digital device with the foldable screen.

PREFERRED EMBODIMENT

Hand-held Digital Device, FIGS. 1-8

The first preferred embodiment of a personal digital device is a hand-held digital device carried similarly to a conventional cellular phone. This approach is aimed to simplify the user's learning process by adopting the commonly used cellular phone format, while adding a substantially new value. The hand-held digital device's flexible architecture allows the user to choose a configuration, which is the most suitable to handle a particular task.

Figure 5:
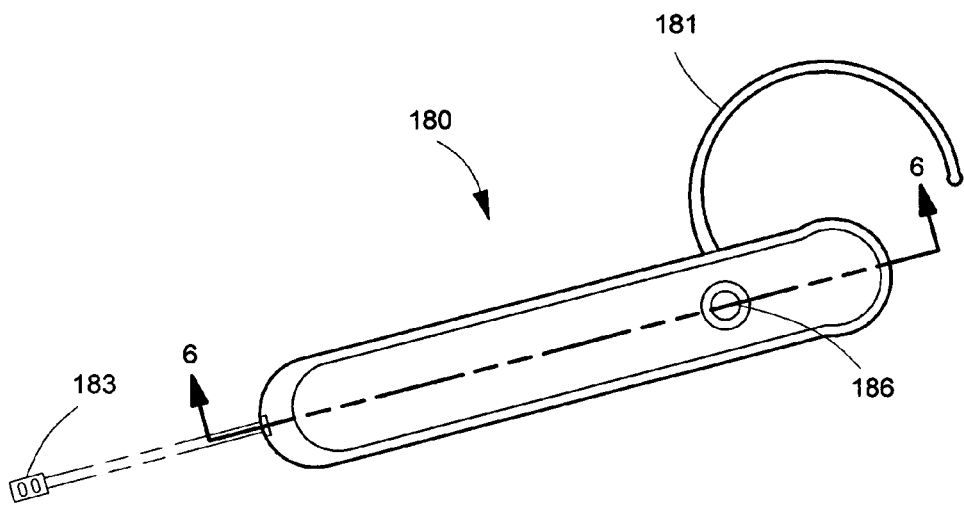
FIG. 5 shows a front view of the detachable audio unit.
Figure 8:
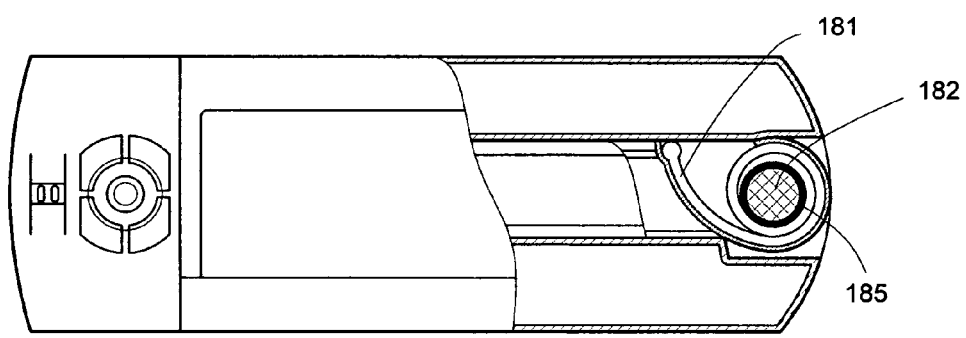
FIG. 8 shows the audio unit when inside the handset.

The hand-held digital device 1 (FIG. 2) includes a handset-like body 100 having means for wireless communication as well as means for storing and processing information, the variable stiffness screen 10; and an audio unit 180 detachably connected to the body 100 (FIGS. 4, 5 and 8). The screen 10 is mounted inside a flexible flat sleeve 150 (FIG. 4). The screen 10 is placed in the body's central recessed area wrapping around and connecting to the body 100 by a means of the sleeve 150. A control panel 140 comprises a joystick input device surrounded by a number of buttons organized in a functional manner and placed below the screen 10 (FIG. 2).

The digital device functions in two working modes in regards to the presentation of visual information: when the screen 10 is inside the carrying member, and when it is pulled out. When the screen 10 is inside, the device's configuration is comparable to that of a conventional cellular phone. The sleeve 150 has a rectangular opening 151, allowing for displaying of data in this compact configuration, when the amount of visual information is relatively insignificant (FIG. 2). When the screen 10 is pulled out of the sleeve 150, its fully visible display allows for presenting PDA-like information along with Internet and multimedia content (FIGS. 1 and 3). The screen 10 returns to the closed mode automatically by a means of a pullback winding mechanism, when the screen's support system is deactivated (FIG. 4).

The audio unit 180 has an elongated shape with rounded ends and comprises means for converting, transmitting and receiving audio signals (FIG. 5). The audio unit's speaker 182 and microphone 183 are placed and function similarly to those of a conventional cellular phone, with a microphone at one end and a speaker at the other (FIG. 2). The audio unit 180 performs in two working modes: as an integral part of the body 100, serving as its speaker and microphone, and as an earpiece worn on the user's ear to provide simultaneous handling of video and audio information, as well as hands-free communication.

Figure 6:
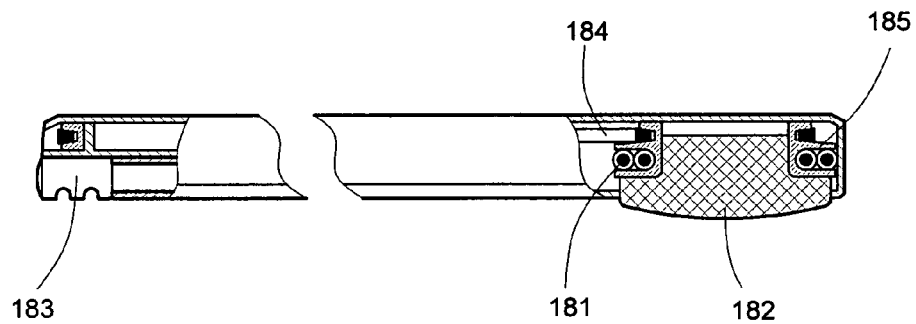
FIG. 6 shows a sectional view taken along section line 6-6 of FIG. 5.
Figure 7:
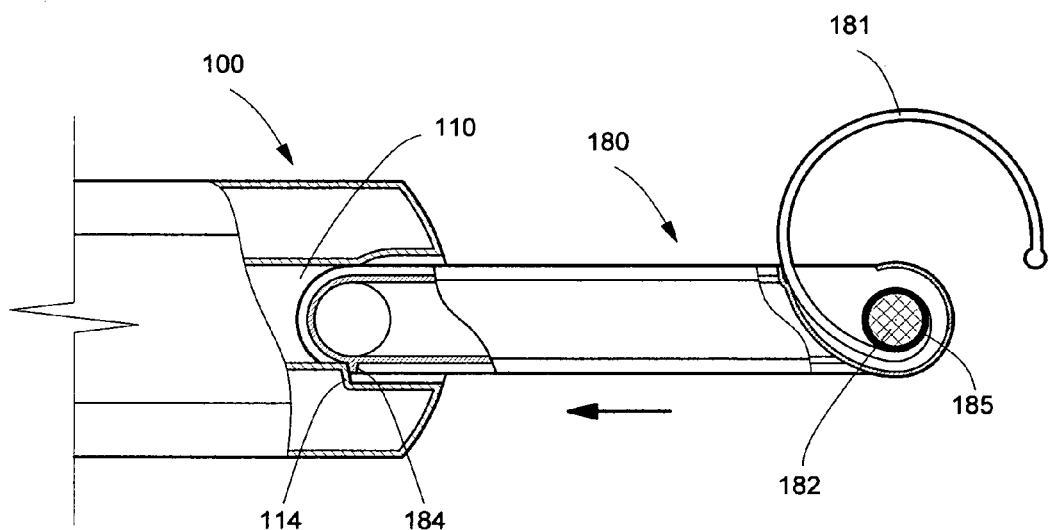
FIG. 7 shows the audio unit sliding into the handset.

To provide this flexibility the audio unit 180 is equipped with a retractable earhook 181 and a supporting mechanism allowing automatic operating of the ear hook 181, when the unit 180 slides in and out of its holder 110, built into the body 100 (FIG. 7). The earhook 181 is a resilient semi-circular element with one end attached to a respective reel 185 mounted coaxially with the speaker 182 (FIGS. 6 and 7). The earhook 181 retracts by winding onto the reel 185, which, in turn, is driven by a tooth belt 184 moveably engaged with a corresponding internal stop 114 belonging to the holder 110 (FIG. 7). The earhook 181 is made of suitable materials, for instance, a stainless steel wire coated with a layer of silicon rubber.

As part of the body 100, the audio unit 180 resides in the holder 110 (FIG. 8), and is electrically connected to the body. The speaker 182 is placed in a corresponding semicircular acoustical opening 120 (FIG. 3). The microphone 183 is accessed through an acoustical duct 130 at the bottom of the body 100 (FIGS. 2 and 3). In this integrated configuration the earhook 181 winds onto the reel 185 to completely fit inside the holder 110 (FIG. 8).

In the earpiece mode the audio unit 180 is wirelessly connected to the body member 100 by using suitable means of communication (for instance, "Bluetooth" Wireless Standard). The earhook 181 unwinds restoring its original semi-circular shape, which enables the audio unit 180 to mount on the user's ear (FIGS. 5 and 7). The microphone 183 can be adjusted proximate to the user's mouth by retracting its boom. A single actuation button 186 operates the audio unit 180, when it is depressed to receive or place a call (FIG. 5).

SECOND PREFERRED EMBODIMENT

Sliding Hand-held Digital Device, FIGS. 9-13

The second preferred embodiment of a personal digital device is a sliding hand-held digital device allowing for changing of the device's configuration depending on the user's needs.

Figure 10:
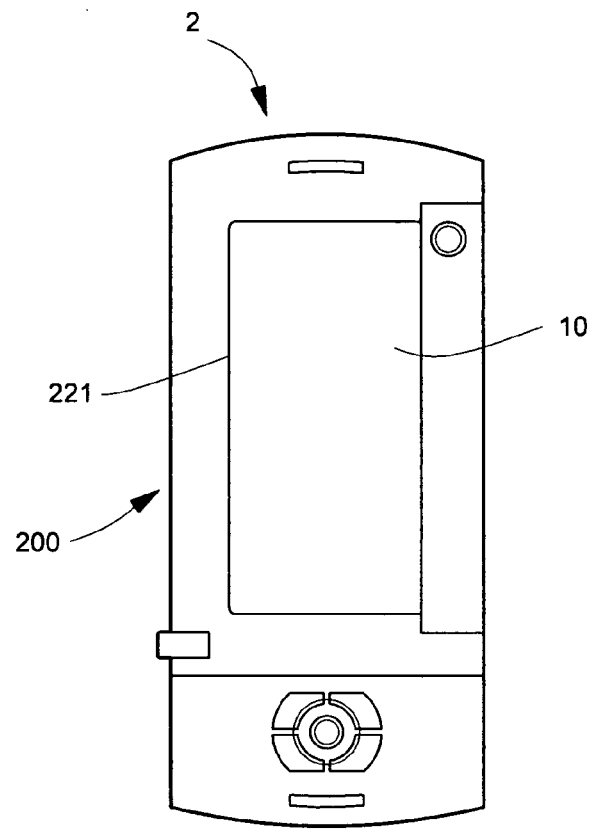
FIG. 10 shows a front view of the sliding hand-held digital device in the retracted closed mode.
Figure 11:
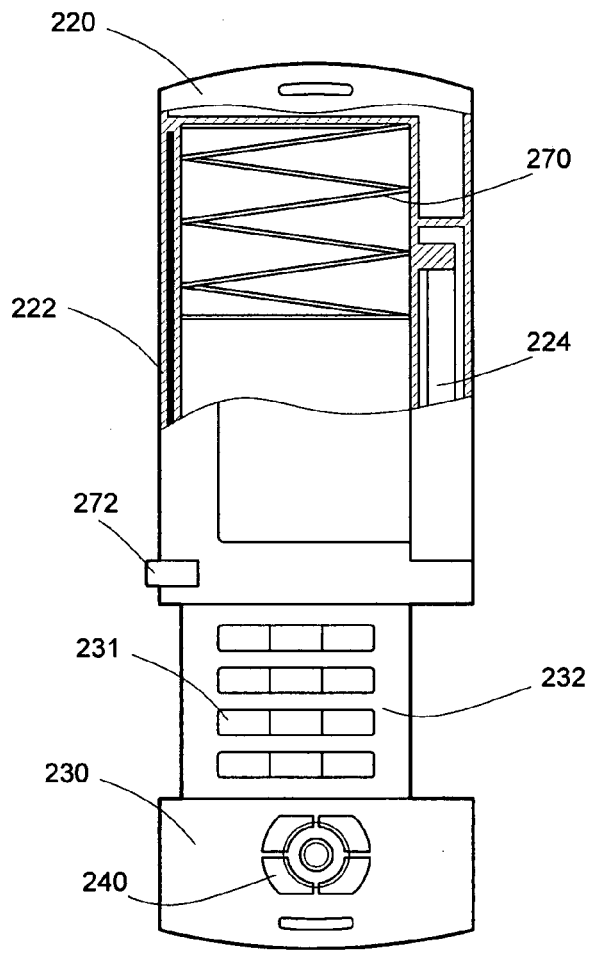
FIG. 11 shows a front view of the sliding hand-held digital device in the extended closed mode with a broken-out section.
Figure 13:
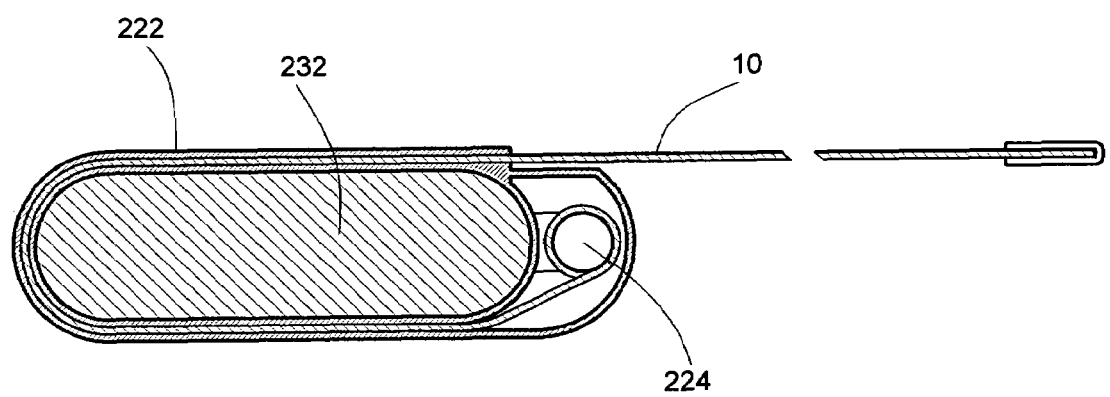
FIG. 13 shows a sectional view taken along section line 13-13 of FIG. 12.

The hand-held digital device 2 comprises the variable stiffness screen 10 and a two-part body 200, wherein an upper part 220 is telescopically coupled to a lower part 230 (FIGS. 10 and 11). The upper part 220 includes a double-wall tubular casing element 222 having a racetrack-shaped cross-section, and the screen 10 moveably sandwiched between the casing's walls. The casing element 222 comprises an embedded electrical circuitry and a pullback winding mechanism 224 to connect the screen 10 to the body 200 electrically and mechanically. A recessed area 232 of the lower part 230 fits inside the casing element 222, thus allowing for a longitudinal sliding movement of the one part with respect to the other. The pullback winding mechanism 224, identical to that of the sleeve 150 of the previous embodiment, is mounted inside the casing element 222 providing the automatic withdrawal of the screen 10 (FIGS. 11 and 13).

Figure 9:
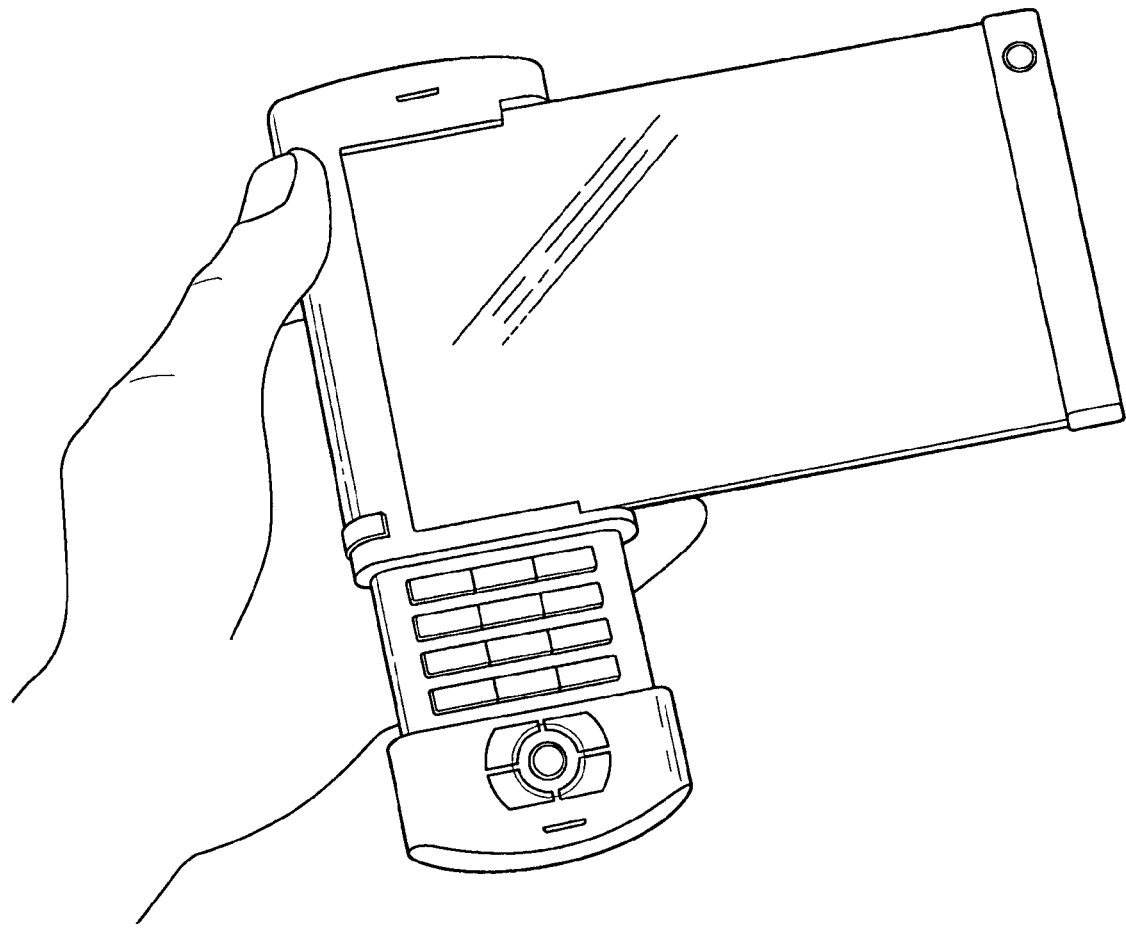
FIG. 9 shows an overall perspective view of the sliding hand-held digital device.

The lower part 230 contains the main electronic components along with a control panel 240, located on its front surface. The control panel 240 comprises a joystick input device with a cluster of functional buttons and a conventional alphanumeric keypad 231 located in the recessed area 232 of the lower part 230 (FIGS. 9 and 11).

The body functions in two operational positions: extended and retracted. In the compact retracted position the recessed area 232 of the lower part 230 is moved inside the casing element 222 of the upper part 220 (FIG. 10). In the extended position the user is enabled to access the numerical keypad of the device. The movement and positioning of the lower part 230 are provided by a sliding mechanism including a compression spring 270 and a locking element having a release button 272. The spring 270 resides inside the casing element 222 filling the void between the upper and lower parts of the device 2, thus providing automatic positioning of the part 230 in the extended mode (FIG. 11). The locking element provides holding of the part 230 in the retracted mode. The release button 272 is located in the upper body 220 where it is easily accessible by the user. By depressing the release button 272, the user frees the respective sliding part, being urged by the spring 270, to move to the extended position of the body 200.

Figure 12:
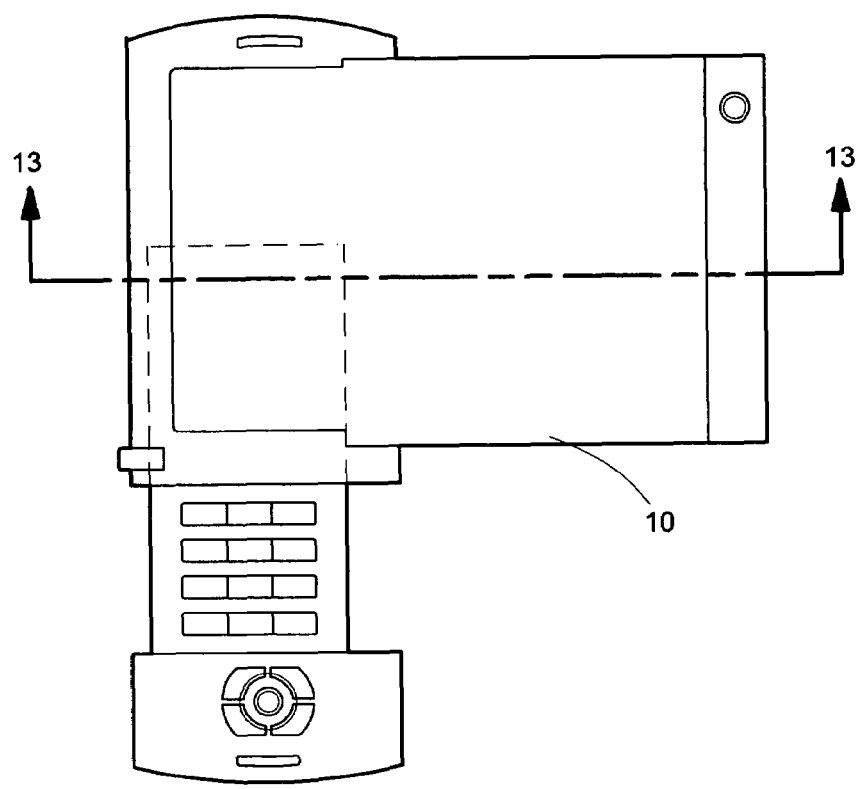
FIG. 12 shows a front view of the sliding hand-held digital device in the extended open mode.

The digital device functions in two working modes in regards to the presentation of visual information: when the screen 10 is inside the casing element 222, and when it is pulled out. When the screen 10 is inside, the device's configuration is comparable to that of a conventional cellular phone. The casing element 222 has a rectangular opening 221 identical to that of the device 1, respectively allowing for displaying data in this compact configuration (FIG. 10). When the screen 10 is drawn from the casing element 222, it enables displaying of a rather large and complex amount of visual information (FIGS. 9 and 12). The screen 10 returns to the closed mode automatically by a means of the pullback winding mechanism 224, when the screen's support system is deactivated (FIGS. 11 and 13).

THIRD PREFERRED EMBODIMENT

Folding Hand-held Digital Device, FIGS. 14-20

The third preferred embodiment of a personal digital device is a folding hand-held digital device configured similarly to a "clamshell" cellular phone.

Figure 16:
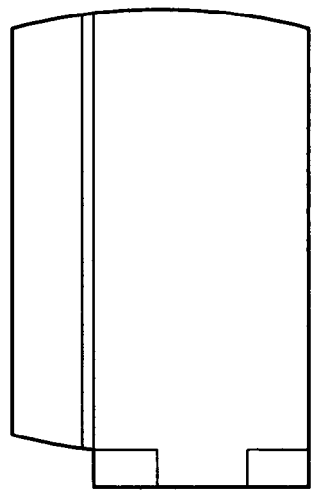
FIG. 16 shows a front view of the folding hand-held digital device in the closed configuration.
Figure 17:
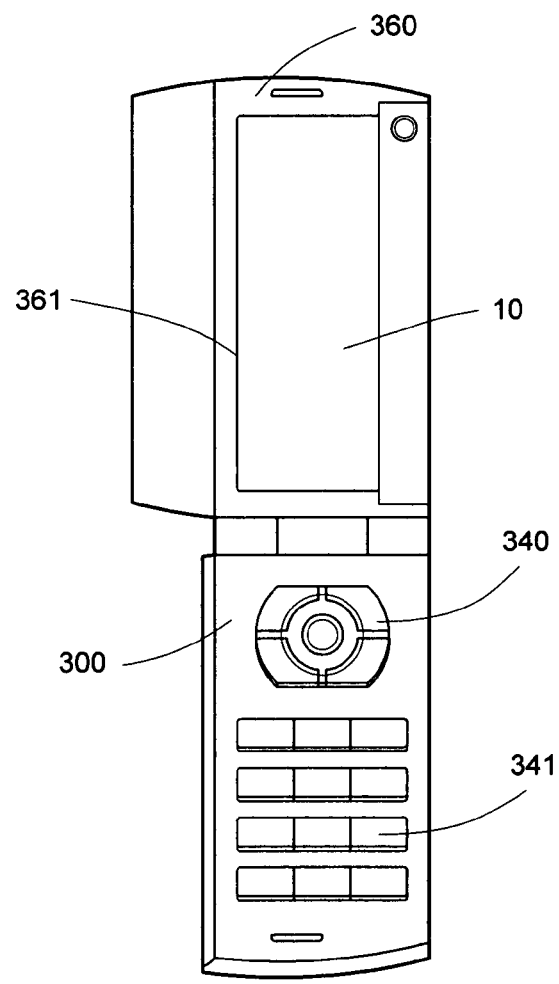
FIG. 17 shows a front view of the folding hand-held digital device in the open configuration.

When the physical properties of a flexible display allow rolling it in a rather tight manner, a rigid enclosure becomes an appropriate way to contain the variable stiffness screen. A folding hand-held digital device 3 (FIG. 17) comprises a screen 10 encased in a rigid enclosure 360, and a body 300. The enclosure 360 is hingeably attached to the body 300 (FIGS. 16 and 17). A control panel 340, comprising a joystick input device surrounded by a number of functional buttons and a conventional alphanumerical keypad 341, are located on the front surface of the body 300 (FIG. 17).

Figure 14:
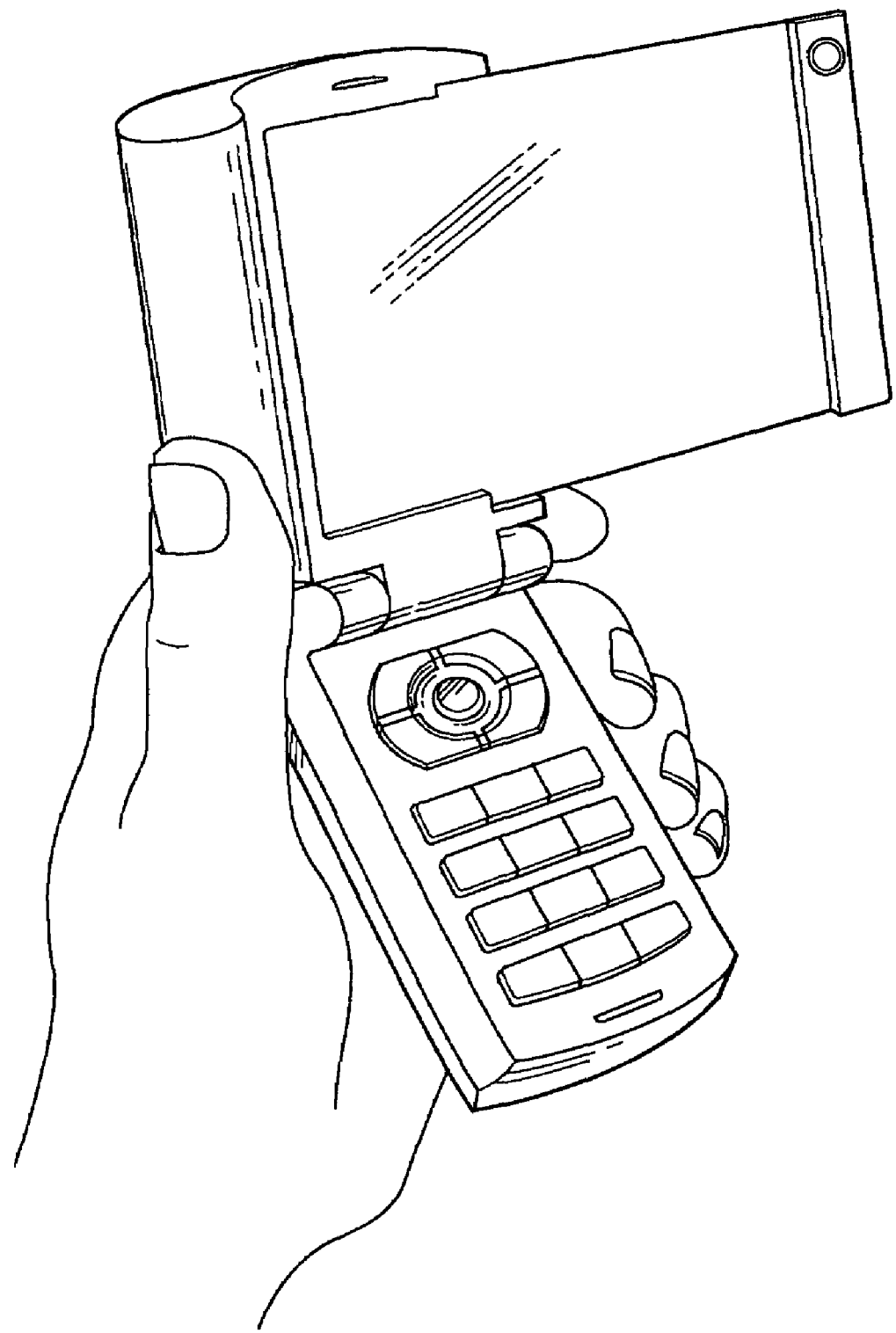
FIG. 14 shows an overall perspective view of the folding hand-held digital device.
Figure 15:
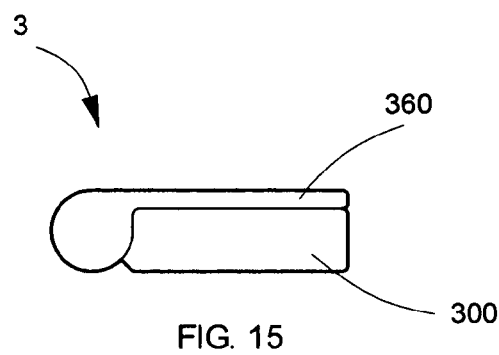
FIG. 15 shows a top view of the folding hand-held digital device in the closed configuration.
Figures 18, 19:
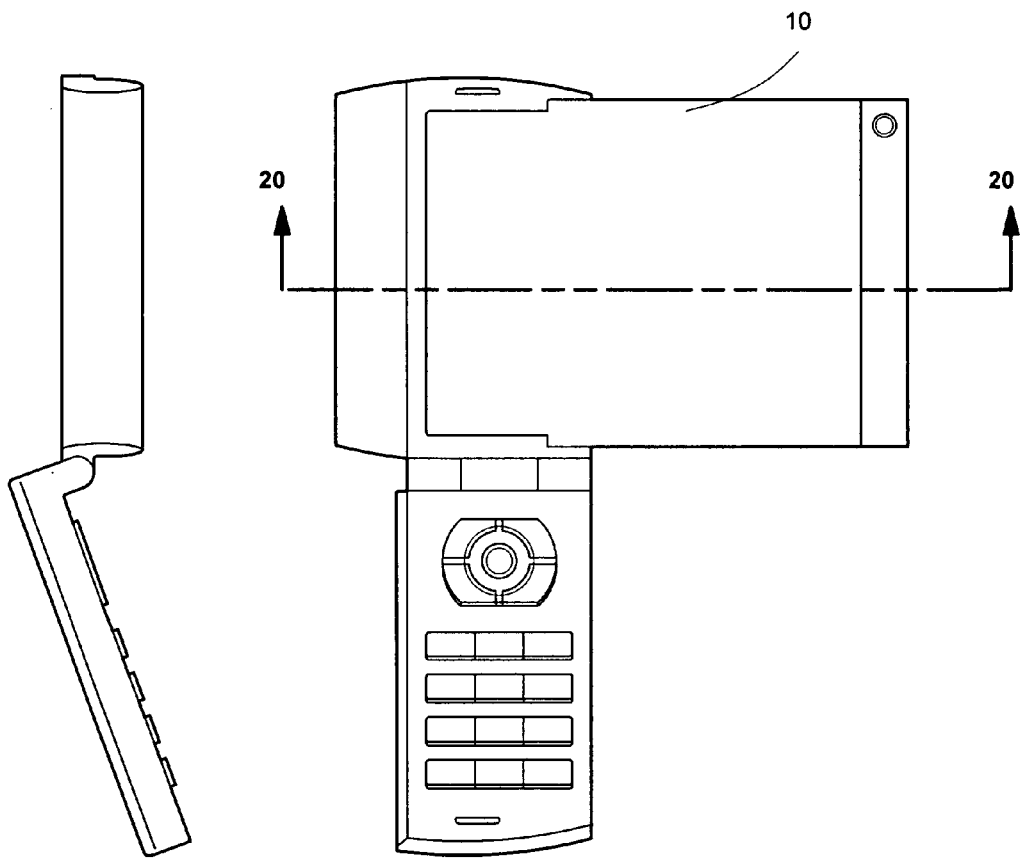
FIG. 18 shows a side view of the folding hand-held digital device in the open configuration.
FIG. 19 shows a front view of the folding hand-held digital device in the open configuration with the fully extended screen.
Figure 20:
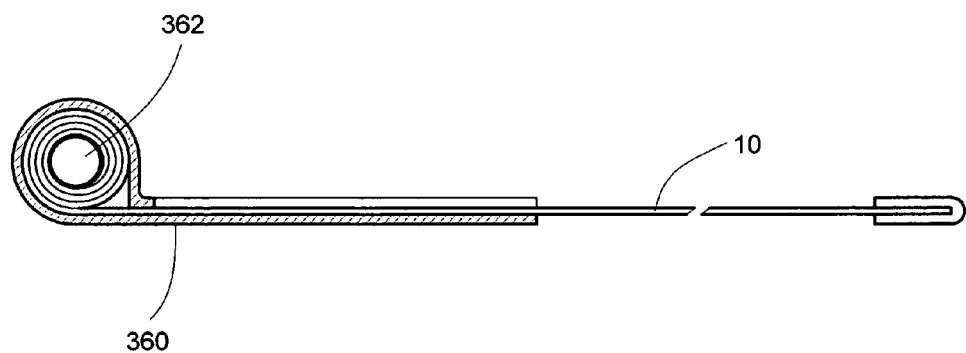
FIG. 20 shows a sectional view taken along section line 20-20 of FIG. 19.
Figure 21:
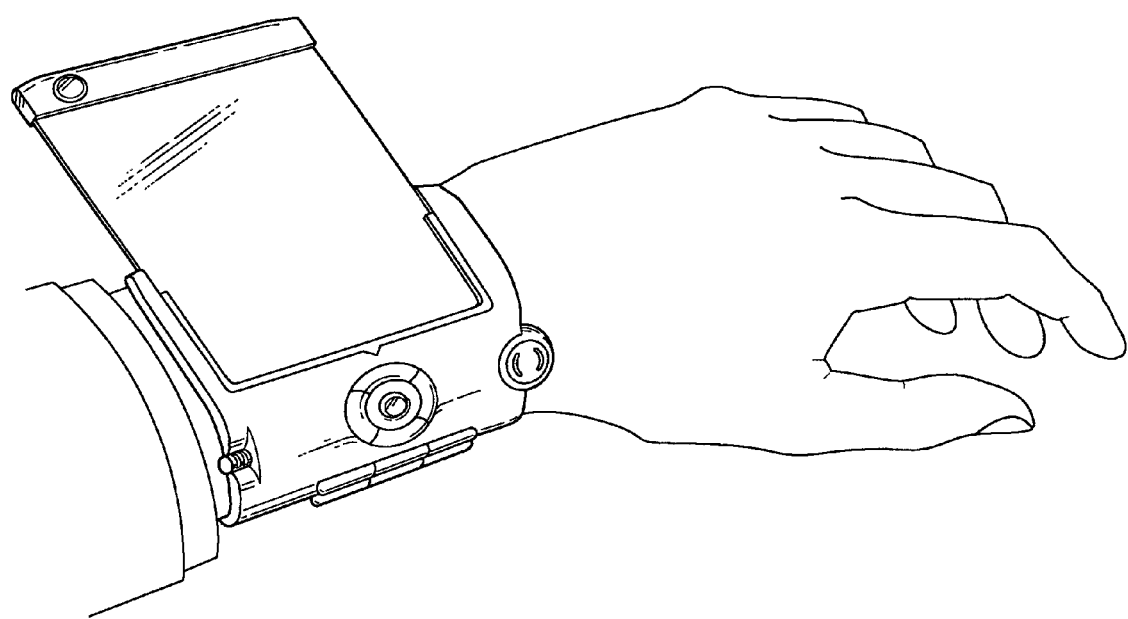
FIG. 21 shows an overall perspective view of the articulated wrist-worn digital device.

A cross-sectional configuration of the enclosure 360 allows folding of the digital device 3 in a rather compact manner. When the digital device 3 is folded, the shape of the body 300 complements the shape of the enclosure 360 (FIG. 15). When the digital device 3 is unfolded, the way of using it is the same as that of the digital device 1 disclosed above. The digital device 3 works in two modes: when the screen 10 is inside the enclosure 360, and when it is pulled out. When the screen 10 is inside, the device's configuration is comparable to that of a conventional "clamshell" cellular phone (FIG. 17). The enclosure 360 has a rectangular openings 361 identical to that of the device 1, allowing for displaying data when the screen is fully retracted (FIG. 17). When the screen 10 is drawn from the enclosure 360, it enables presentation of high-quality graphics and images on its now significantly larger display (FIGS. 14 and 19). The screen 10 is withdrawn inside the enclosure 360 automatically by a means of a pull-back winding mechanism 362, when the screen's support system is deactivated (FIG. 17).

ADDITIONAL EMBODIMENT

Articulated Wrist-Worn Digital Device, FIGS. 21-30

The wrist has endured as the one body part upon which humans have historically relied for conveying information technology, which, in its early adaptation, is also known as "the watch". The proposed design combines the device's position on the user's forearm with the means to process and present information of the hand-held digital device 1 described above.

Figures 25, 26:
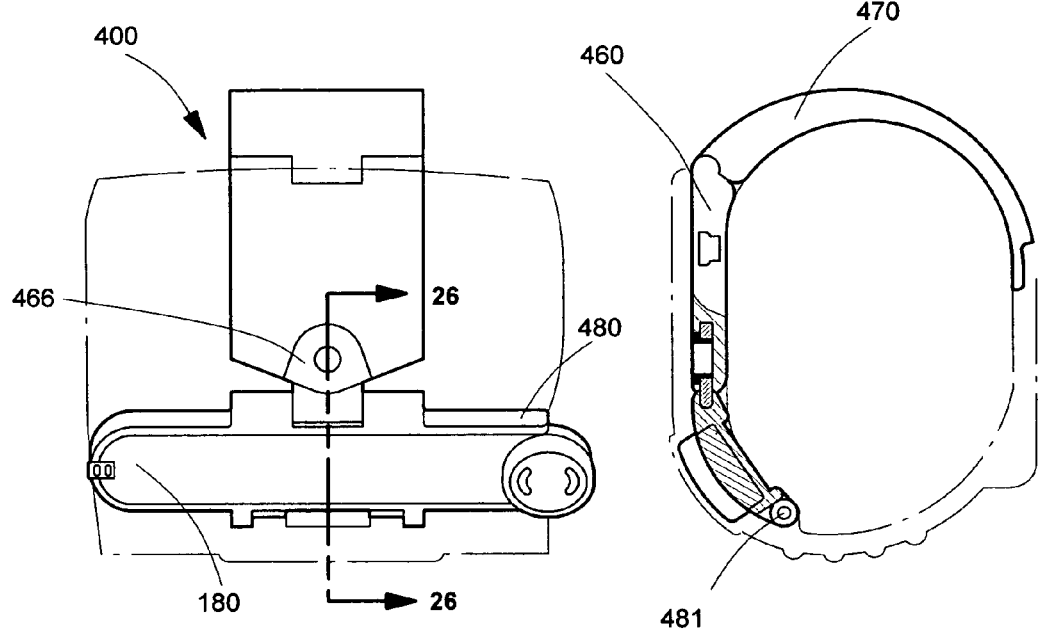
FIG. 25 shows a top view of the articulated wrist-worn digital device without the sleeve.
FIG. 26 shows a side view of the articulated wrist-worn digital device without the sleeve.

The articulated wrist-worn digital device 4 is positioned on the user's wrist similarly to a regular wristwatch and includes a body 400, the variable stiffness screen 10 contained in a sleeve 450, and the audio unit 180 (FIGS. 22 and 25). The body 400 comprises a top part 460 and a rear part 470 hingeably connected to each other. The top part 460 houses the componentry for wireless communication, as well as for storing and processing information, and is kept in place by the rear part 470 and the sleeve 450 (FIG. 23). The sleeve 450 and the rear part 470 function as a wristband of the device 4. The audio unit 180 is detachably connected to the wrist-worn digital device 4 and can be used in two different modes. The wrist-worn digital device's control panel 440, located directly below the screen's rectangular opening 451 (FIGS. 22 and 24), is built around a joystick-like input device.

The flexible architecture of the wrist-worn digital device 4 allows the user to choose a particular configuration depending on the specifics of use. In a standby mode or when the amount of information is relatively small the device 4 is in the compact, closed configuration without having large protruding parts (FIG. 10). The variable stiffness screen 10, while inside the sleeve 450, gently bends around the user's wrist in such a way that the bending radius remains generous enough to prevent any potential damage to the display's organic compound (FIG. 12). A conventional keypad 454 is conveniently located on the front portion of the sleeve 450 (FIG. 11).

When the screen 10 is pulled out of the sleeve 450, the resulting viewable area allows for displaying PDA-like information along with Internet content (FIGS. 9, 16 and 17). The screen 10 returns to the closed mode automatically by means of a pullback winding mechanism 452, when the screen's support system is deactivated (FIG. 14).

The architecture of the digital device 4 also supports the two working modes of the audio unit 180: as an integral part of the digital device 4, while attached to the body's top part 460 and serving as the device's speaker and microphone, and as an earpiece being worn on the user's ear. As part of the digital device 4, the audio unit 180 mates to its holder 480 in the same way as it does to the built-in holder 110 of the body 100 of the hand-held digital device 1 (FIGS. 7 and 8). The holder 480 is pivotally attached to the top part 460 with a connecting member 482 (FIGS. 25, 27 and 27) and, besides containing the audio unit 180; it functions as a structural element connecting the sleeve 450 with the body 400. In the earphone mode the audio unit 180 is wirelessly connected to the body 400 in the same fashion as that of the hand-held digital device 1.

Figure 27:
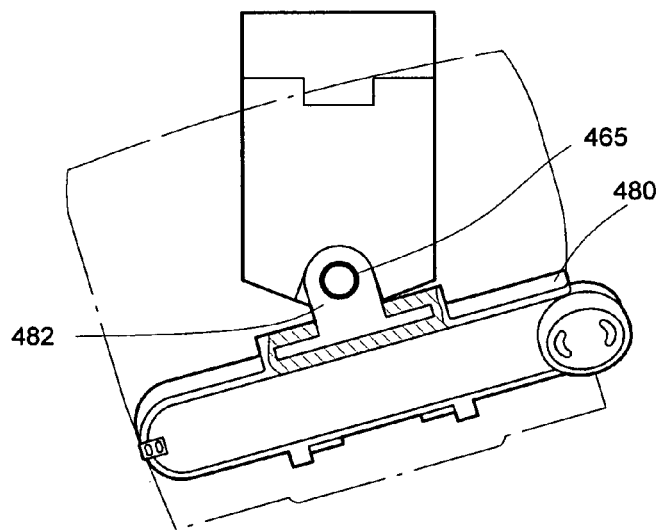
FIG. 27 shows a top view of the articulated wrist-worn digital device with the holder rotated about the body.
Figure 28:
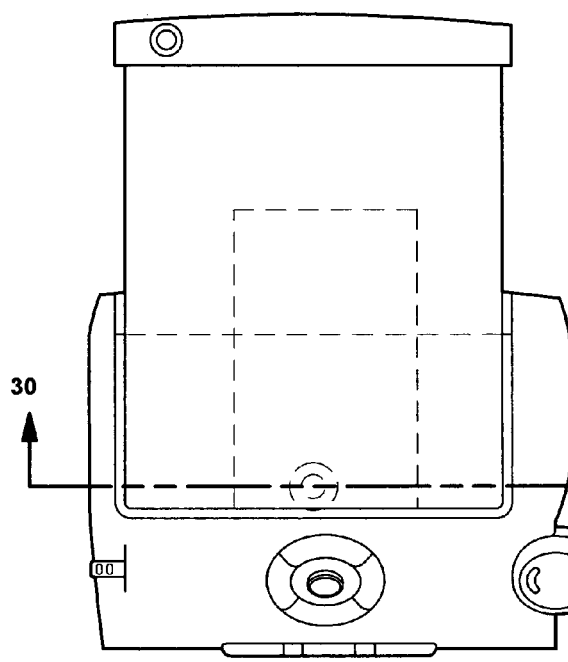
FIG. 28 shows a top view of the articulated wrist-worn digital device in the open mode.
Figure 29:
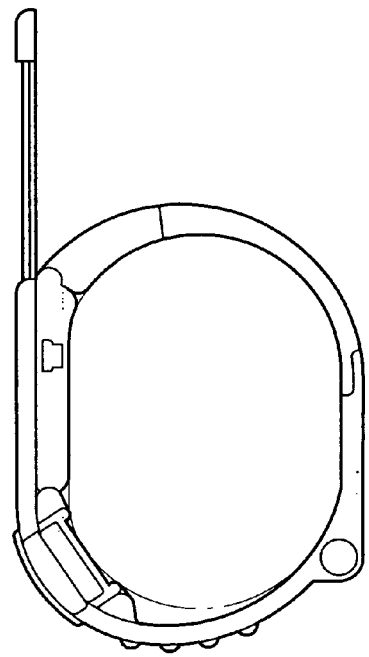
FIG. 29 shows a side view of an articulated wrist-worn digital device in the open mode.
Figure 30:
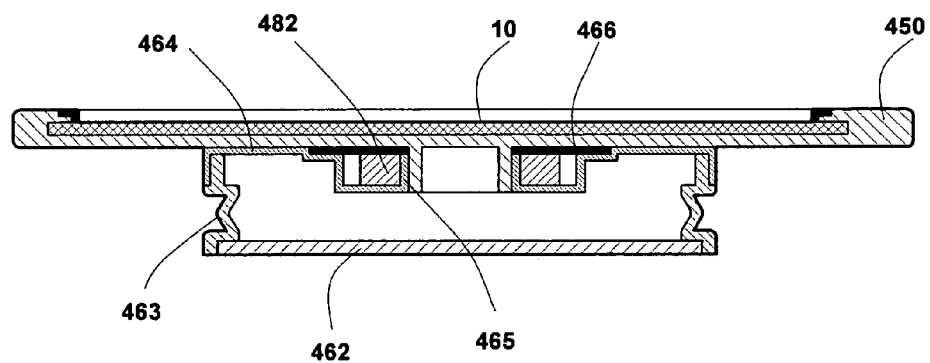
FIG. 30 shows a sectional view taken along section line 30-30 of FIG. 28.

The wrist-worn digital device 4 is configured to be mounted on the user's wrist. To ensure an ergonomically correct fit, the collective cross-sectional shape of the sleeve 450, the top part 460 and the rear part 470 follows the cross-sectional shape of the human wrist. The wrist-worn digital device 4 includes the proposed means of adjustment. Firstly, the articulation of the digital device 4 is provided by the pivotal attachment of the sleeve 450 to the body 400 by way of the connecting member 482 and the holder 480 The connecting member 482 rotates about a cylindrical protrusion 465 belonging to the top part 460 and, at the same time, its opposite side is hingeably attached to the holder 480 (FIG. 27). This coupling is secured by the use of a cover 466 (FIGS. 25 and 30). Structurally the holder 480 serves as a link between the sleeve 450 and the connecting member 482. The sleeve 450 incorporates a hinge element 453 (FIG. 23) coupled to a corresponding hinge element 481 of the holder 480 (FIGS. 25, 26 and 27). This design allows the sleeve 450 to rotate about the body 400, and, consequently, to provide desirable adjustment of the sleeve, necessitated by its width, to the user's wrist.

Secondly, to avoid some discomfort associated with wearing of the digital device for a relatively long period of time, the top part 460 is constructed in a particular way. The top part 460 comprises a lower housing 462, made of soft silicon rubber, with a resilient sidewall 463, and a rigid upper housing 464 (FIG. 30). Each of these elements is specifically designed to address certain aspects of the adjustment. The soft lower housing 462 comes in contact with the skin conforming to the shape of the user's wrist. The rigid upper housing 464 carries a chassis for electronic components and protects them. The resilient sidewall 463 absorbs any apparent flexing in the wrist, thus allowing the chassis to retain its geometry. This structural approach results in a desirably comfortable position of the top part 460, while providing proper accommodation to the relatively wide screen 10 on the user's wrist.

SECOND ADDITIONAL EMBODIMENT

Sliding Wrist-Worn Digital Device, FIGS. 31-38

A rigid enclosure-based design of the screen's carrying member allows reduction of the overall thickness of the proposed device to a level comparable to that of a conventional wristwatch. It allows a shirt cuff to slide across the device without snagging.

Figure 31:
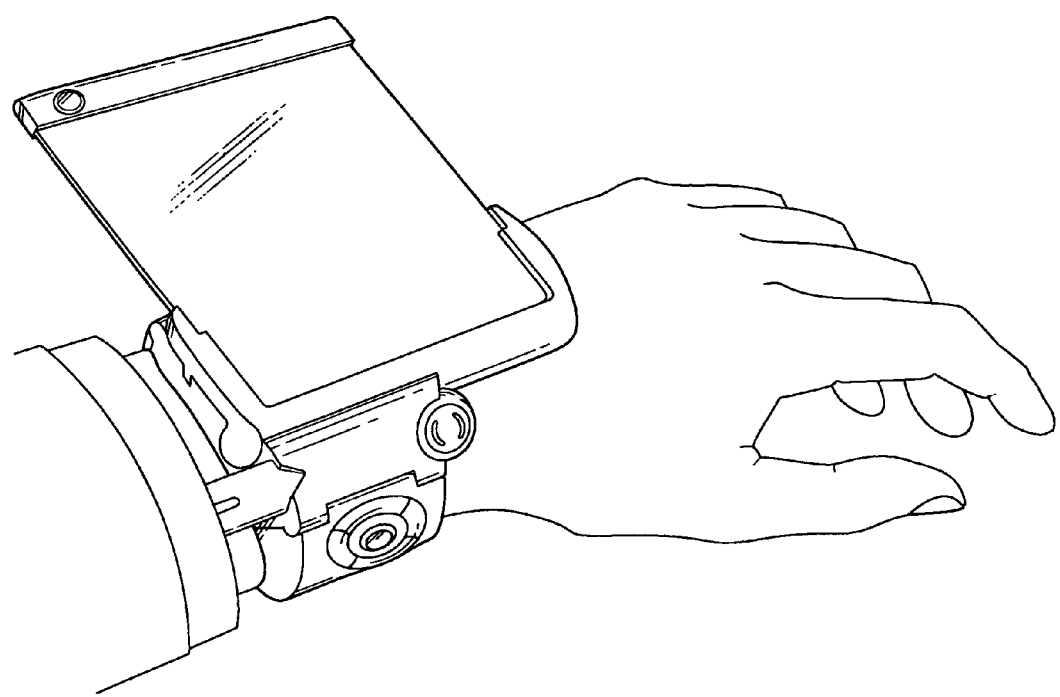
FIG. 31 shows an overall perspective view of the sliding wrist-worn digital device.
Figure 32:
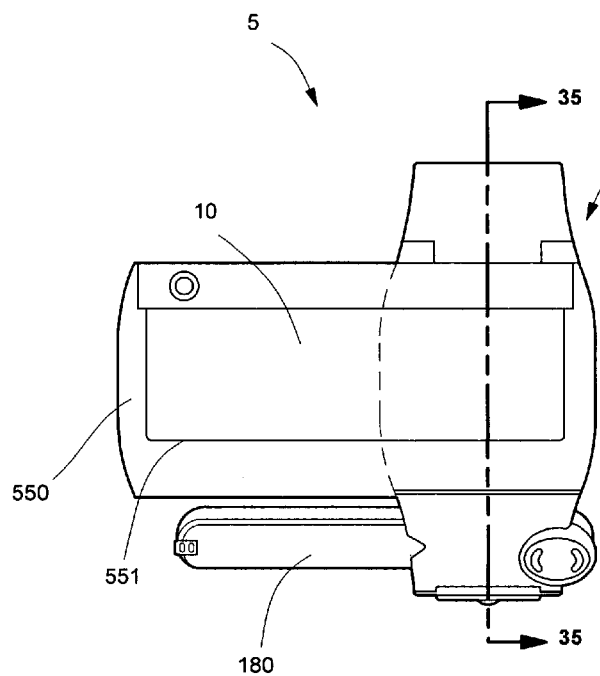
FIG. 32 shows a top view of the sliding wrist-worn digital device in the closed mode, with the enclosure in its left position.
Figure 33:
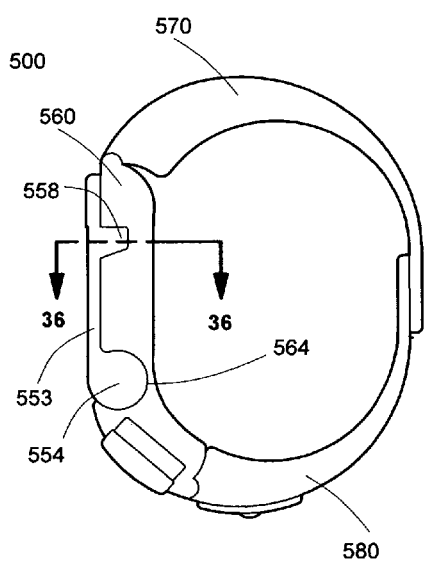
FIG. 33 shows a side view of the sliding wrist-worn digital device
Figure 34:
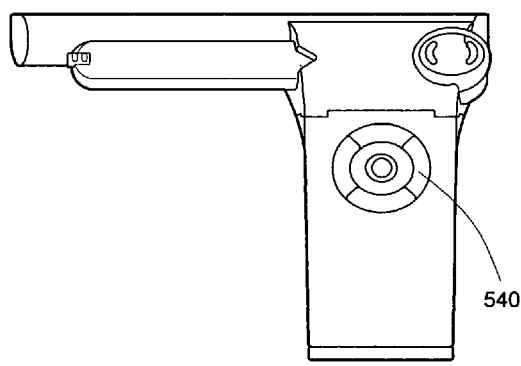
FIG. 34 shows a front view of the sliding wrist-worn digital device with the enclosure in its left position.
Figure 35:
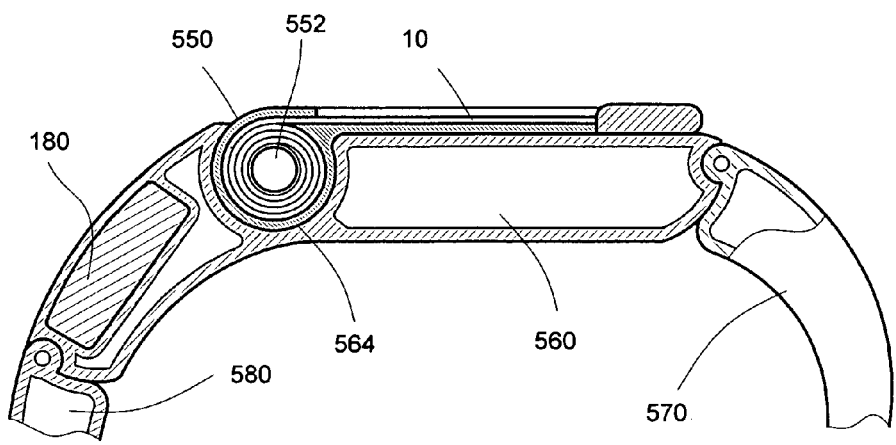
FIG. 35 shows a sectional view taken along section line 35-35 of FIG. 33.

The sliding wrist-worn digital device 5 comprises a body 500, the variable stiffness screen 10 encased in a rigid enclosure 550 moveably coupled to the body 500, and the audio unit 180 (FIGS. 31 and 32). The body 500 houses electronic componentry and includes a front part 580, a top part 560 and a rear part 570 (FIG. 33). The front and rear parts are hingeably connected to the top part 560 to provide mounting of the device 5 on the user's wrist. The top part 560 carries the enclosure 550 and the audio unit 180 (FIG. 35). The audio unit 180 functions in the same way as it does in the articulated wrist-worn digital device 4, disclosed above. A control panel 540 is located on the front part 580 (FIG. 34). The rear part 570 contains a power supply along with other electronic components.

The enclosure 550 is attached to the top part 560 in a way that allows for changing of the position of the enclosure 550 by sliding it along the user's forearm and wrist. The enclosure 550 comprises a flat portion 553 with a rectangular opening 551 exposing the screen 10, and a cylindrical portion 554 carrying a winding mechanism 552 with a rolled-up portion of the screen 10 (FIGS. 32, 33 and 35). The enclosure 550 is coupled to a corresponding longitudinal cylindrical groove 564 in the top part 560 extending its full length and mated to the cylindrical portion of the enclosure 550 (FIGS. 33 and 35). The groove 564 functions as an enclosure holder and a motion guide. When the user moves the enclosure 550 to change position, the enclosure 550 slides compliantly, guided by the groove 564.

Figure 36:
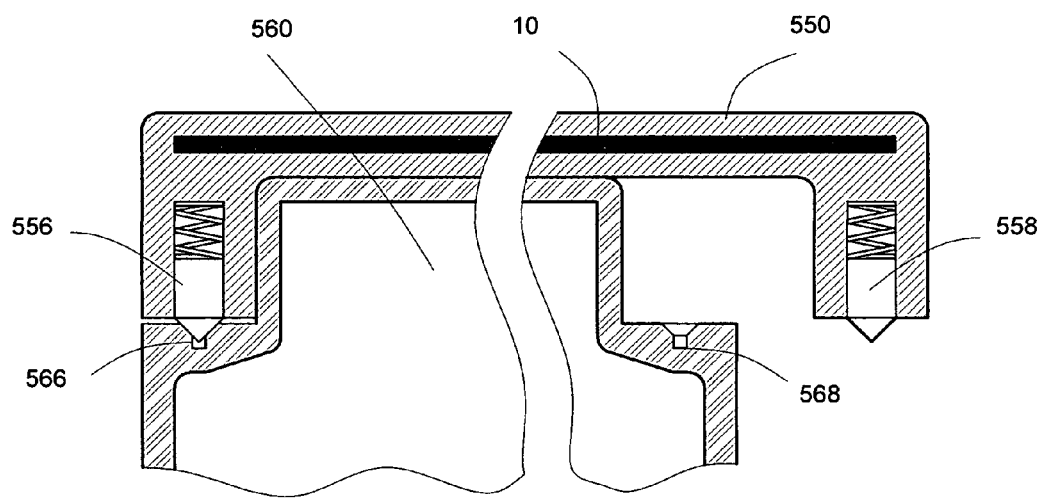
FIG. 36 shows a sectional view taken along section line 36-36 of FIG. 33 when the enclosure is moved to the right.

To control the movement of the enclosure 550 the attachment mechanism includes the necessary locking elements. The enclosure 550 includes two spring-loaded detents 556 and 558 for providing secure positioning and holding (FIG. 36). These detents are placed symmetrically on both right and left sides of the enclosure 550. Correspondingly, there are two recesses 566 and 568 on both right and left sides of the top part 560 to accommodate the detents 556 and 558 (FIG. 36).

Figure 37:
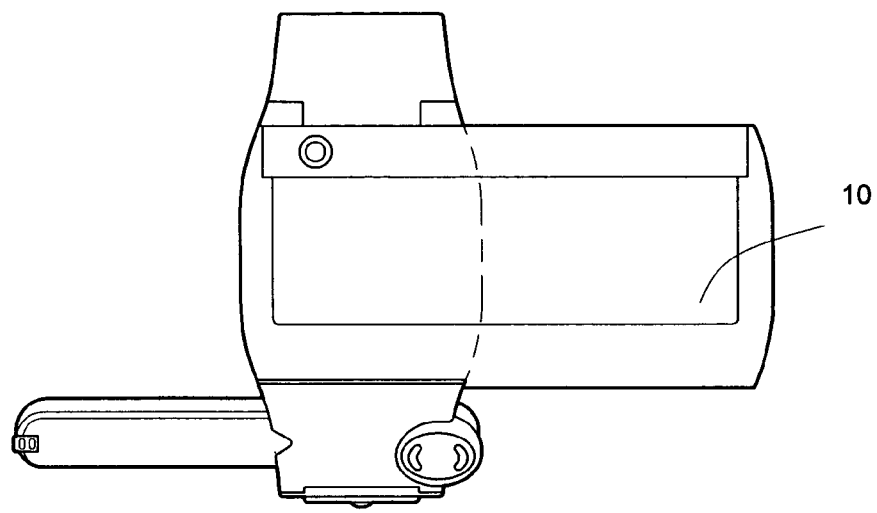
FIG. 37 shows a top view of the sliding wrist-worn digital device in the closed mode with the enclosure in its right position.
Figure 38:
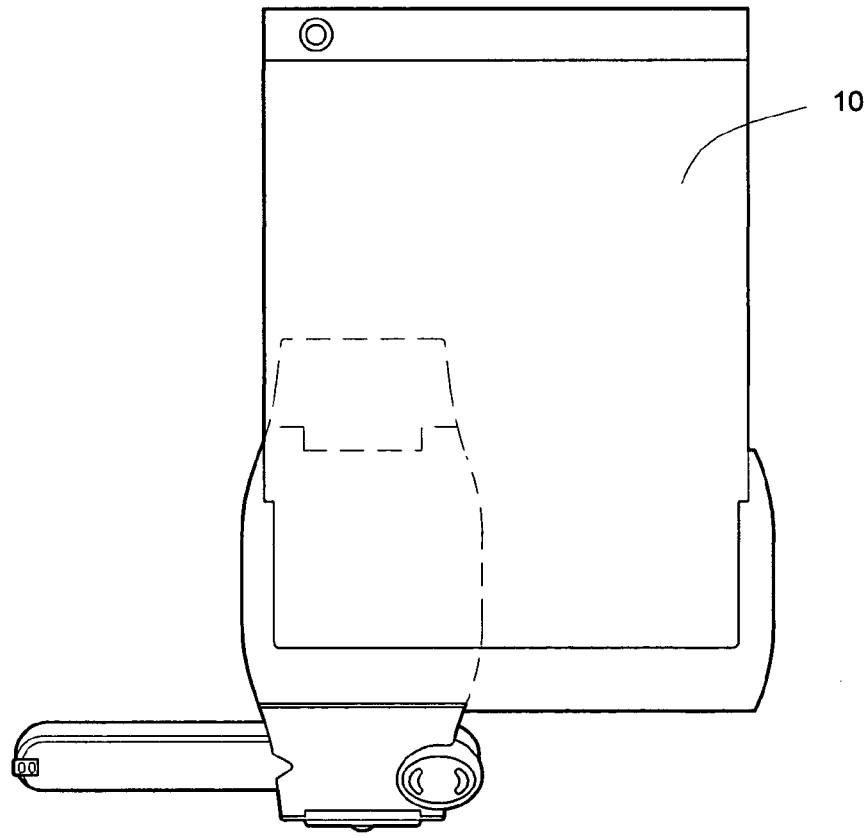
FIG. 38 shows a top view of the sliding wrist-worn digital device in the open mode with the enclosure in its right position.

The advantages of the proposed design are fully realized when the enclosure 550 is moved outward, away from the user's forearm, slightly above the user's wrist (FIG. 37). In this position it is held in place by the left detent 556. The user can pull out the screen 10 to take advantage of the display's full size to handle a corresponding volume of visual information comparable to that of a PDA-like device (FIGS. 31 and 38).

To manipulate a relatively low volume of visual information in a more compact, wristwatch-like configuration, the enclosure 550 has to be moved inward, towards to the user's forearm. The sliding wrist-worn digital device 5 can be hidden beneath the user's sleeve as a regular watch (FIG. 32). In this position it is held in place by the right detent 558.

ALTERNATIVE EMBODIMENT

Wrist-Worn Digital Device with Foldable Screen, FIGS. 39-54

Given its compact size and unobtrusive comfortable position on the arm, this digital device with a foldable screen provides the desirable accessibility of everyday communication devices: when a need arises, it is immediately there; and when it is no longer needed, it disappears.

Figure 41:
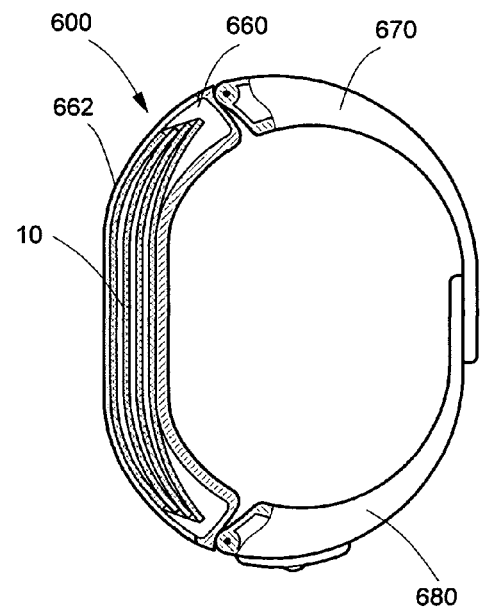
FIG. 41 shows a broken-out sectional view taken along section line 41-41 of FIG. 40 when the cover is closed.

The wrist-worn digital device 6 comprises a body 600 and the variable stiffness screen 10. The body 600 includes a front part 680, a top part 660 and a rear part 670 (FIG. 41). The front and rear parts are hingeably connected to the top part 660 to facilitate mounting of the device 6 on the user's wrist. To ensure an ergonomically correct fit, the collective cross-sectional shape of all three parts of the body 600 follows the cross-sectional shape of the human wrist. The top part 660 accommodates the screen 10, which is pivotally coupled to it (FIG. 41). The screen 10 can be folded for compact storage and unfolded to make the display fully visible to the user, and the folding process is provided by means of a pullback system, when the screen's support system is deactivated. The front part 680 accommodates on its front surface a speaker 620 and a microphone 630 and a control panel 640 (FIG. 45). The rear part 670 houses a power supply along with other electronic components.

Figure 40:
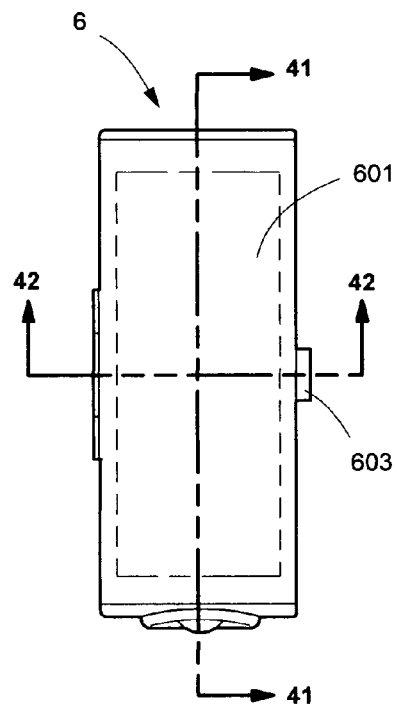
FIG. 40 shows a top view of the wrist-worn digital device with the foldable screen in the closed mode.

The shape of a spring-loaded protective clear cover 662 allows the user to bend the resiliently deformable top and bottom edges of the folded screen 10 by closing the cover and, correspondingly, pressing said edges down to conform them to the curved shape of the inside of the top part 660 (FIG. 41). A latch 603 locks the cover 662 in the closed position (FIG. 40). The screen 10 is folded inside the top part 660 beneath the cover 662 in a way that allows for displaying visual information on a designated flat portion of the screen 10, thus creating a permanent viewable area 601 of the digital device 6. In this configuration the device's overall size is minimal and similar to that of a wristwatch (FIGS. 40 and 41). The device 6 functions in this closed configuration, when the amount of visual information is either relatively small or it is in a standby mode.

Figure 42:
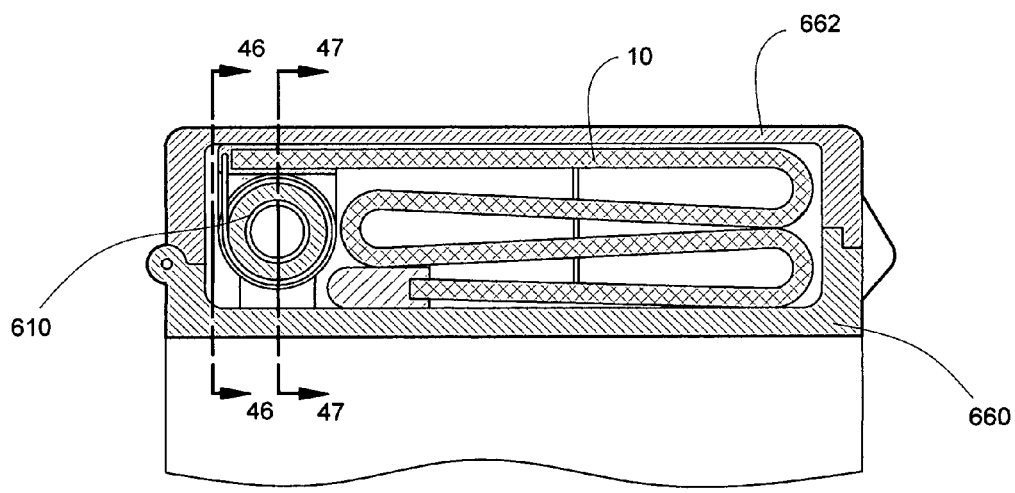
FIG. 42 shows a sectional view taken along section line 42-42 of FIG. 40.
Figure 46:
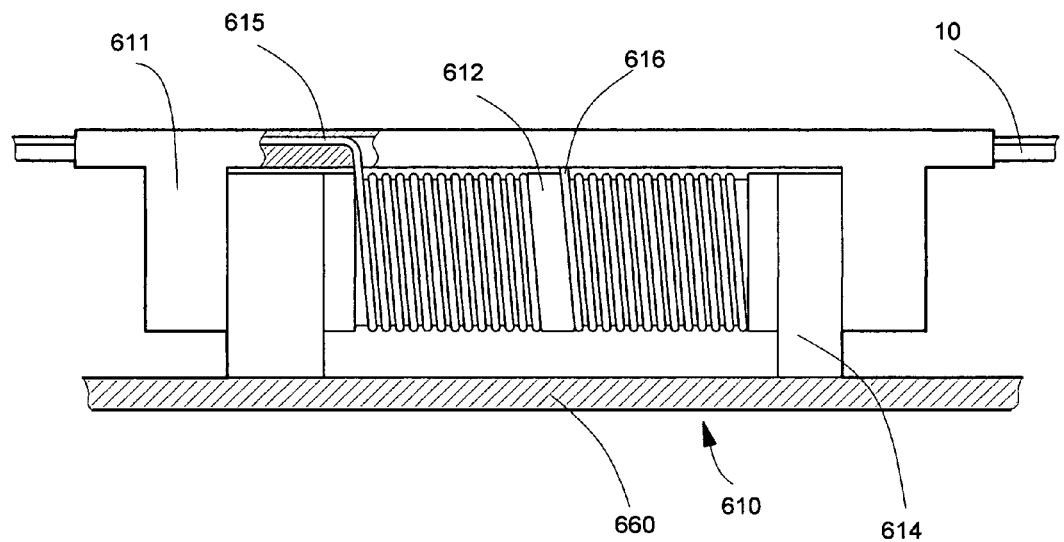
FIG. 46 shows an enlarged sectional view taken along section line 46-46 of FIG. 42 affording view of the winding mechanism.
Figure 47:
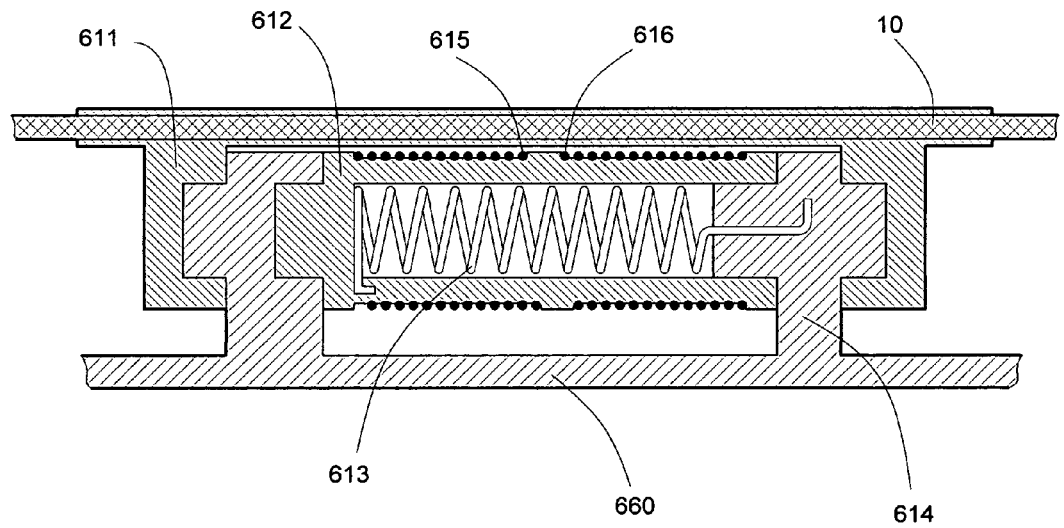
FIG. 47 shows an enlarged sectional view taken along section line 47-47 of FIG. 42.

The screen 10 stays in place, folds and returns to its stored mode by means of a pullback system comprising a winding mechanism 610, a pivoting bracket 611 and cable management means (FIGS. 42, 45, 46 and 47). The pullback winding mechanism 610 is installed inside the top part 660 and includes an elongated drum 612, supported from both ends, and a coil spring 613, housed inside of it along its axis (FIGS. 42, 46 and 47). One end of the coil spring 613 is attached to the inner wall of the drum 612, and the other one is attached to a support 614. As a result, the drum 612 is at all times urged by the spring 613 to wind cables 615 and 616. The screen 10 is secured to the body 600 by being permanently attached to the pivoting bracket 611 mounted to the winding mechanism 610 in a hinge-like manner (FIG. 46). The pivoting bracket 611 has a cylindrical through channel to accommodate and guide the pulling cables going from the winding mechanism 610 to the corresponding edge members.

Figure 48:
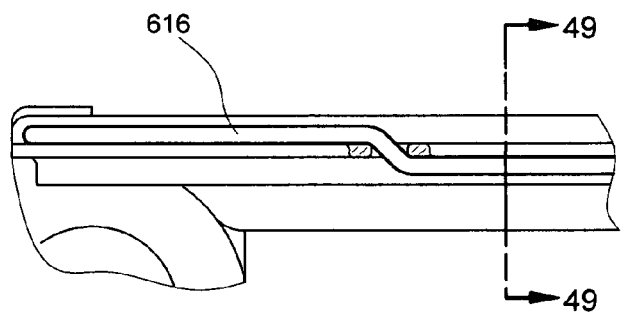
FIG. 48 shows an enlarged segment of the edge member.
Figure 51B:
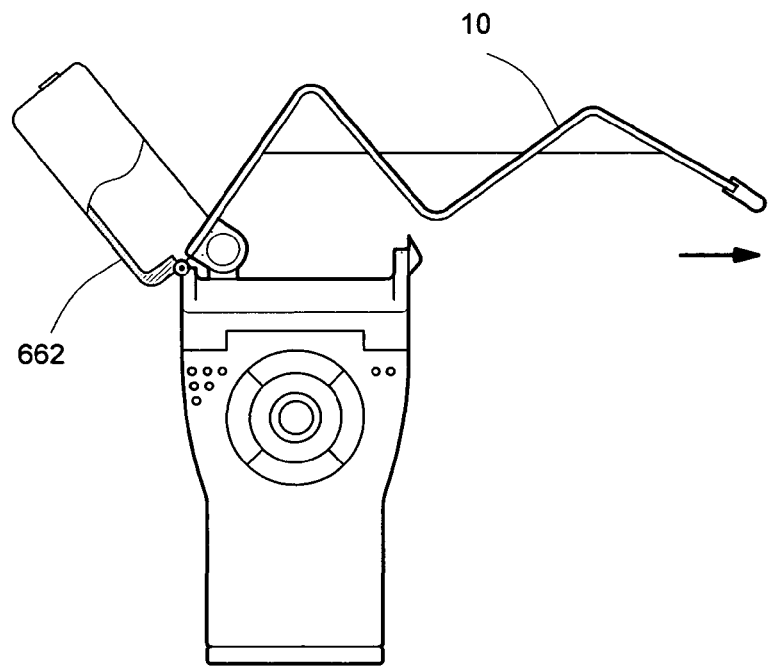
FIG. 51B shows a front view of the wrist-worn digital device with the foldable screen when the screen is in the process of unfolding.
Figure 52:
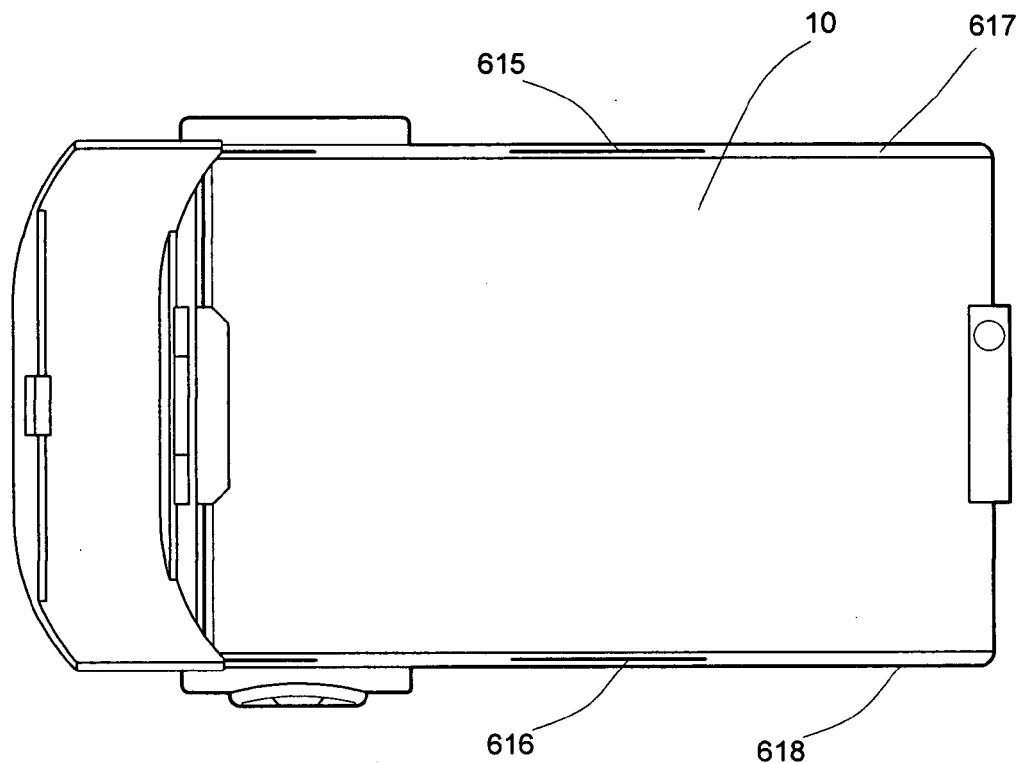
FIG. 52 shows a top view of the wrist-worn digital device with the foldable screen when the screen is fully extended.

The cable management means comprise a pair of pulling cables—an upper cable 615 and a lower cable 616 (FIGS. 46 and 52), and two, symmetrically framing the screen, edge members—an upper edge member 617 and a lower edge member 618 (FIGS. 48, 49, 50 and 52). The cables run along the respective edge members and through a number of openings allowing for engaging the screen's right edge with the winding mechanism 610, which is opposite of it (FIGS. 48 and 52). The openings are placed in a horizontal portion of each edge member to correspond to the middle of each fold (FIGS. 48 and 52). Each cable is permanently attached to a corresponding edge member in the middle of the first fold created by the right side of the screen 10 (FIG. 51B).

Figure 49:
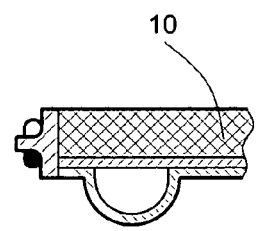
FIG. 49 shows a sectional view taken along section line 49-49 of FIG. 48.
Figure 50:
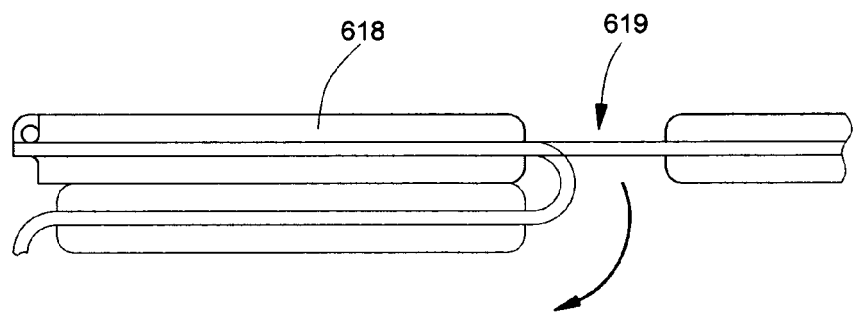
FIG. 50 shows an enlarged segment of the edge member with the cutout.
Figure 51A:
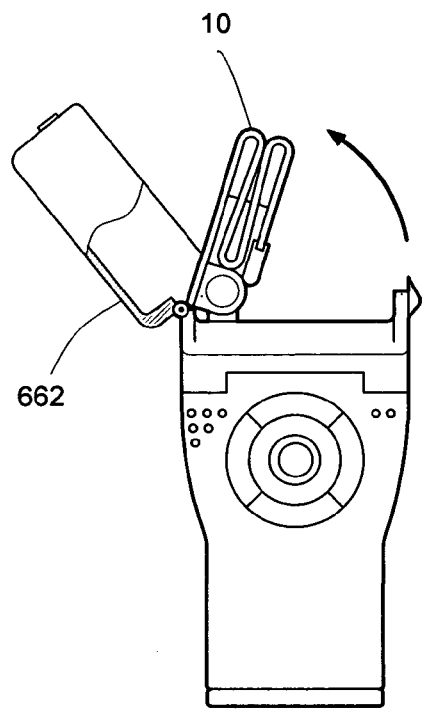
FIG. 51A shows a front view of the wrist-worn digital device with the foldable screen when the folded screen is rotated to initiate the unfolding process.

The edge members have a rotated T-shaped cross-section allowing for placing the cable in a way necessary for pulling back the screen with a simultaneous creation of its folding pattern (FIGS. 49, 50 and 51B). In order for it to be folded, the edge members employ variable stiffness achieved by varying their cross-sections in places where the edge members have to bend along with the screen 10. It is made possible by having a corresponding number of cutouts 619 in vertical portion of each edge member (FIG. 50). This structural approach allows creation of the necessary folding pattern, alternating rigid and flexible elements of the screen 10 (FIGS. 50, 51A and 51B).

Figure 39:
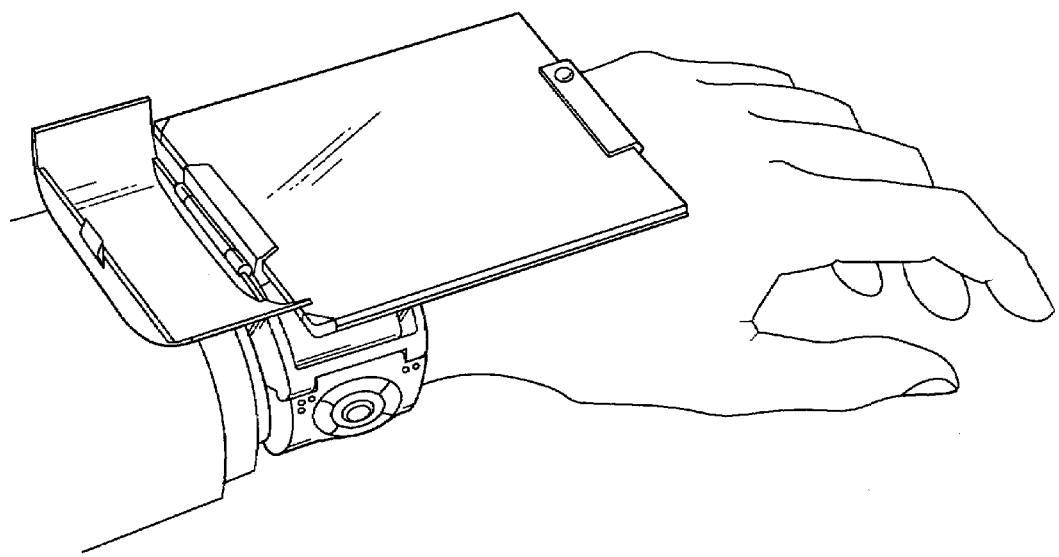
FIG. 39 shows an overall perspective view of the wrist-worn digital device with foldable screen.
Figure 53:
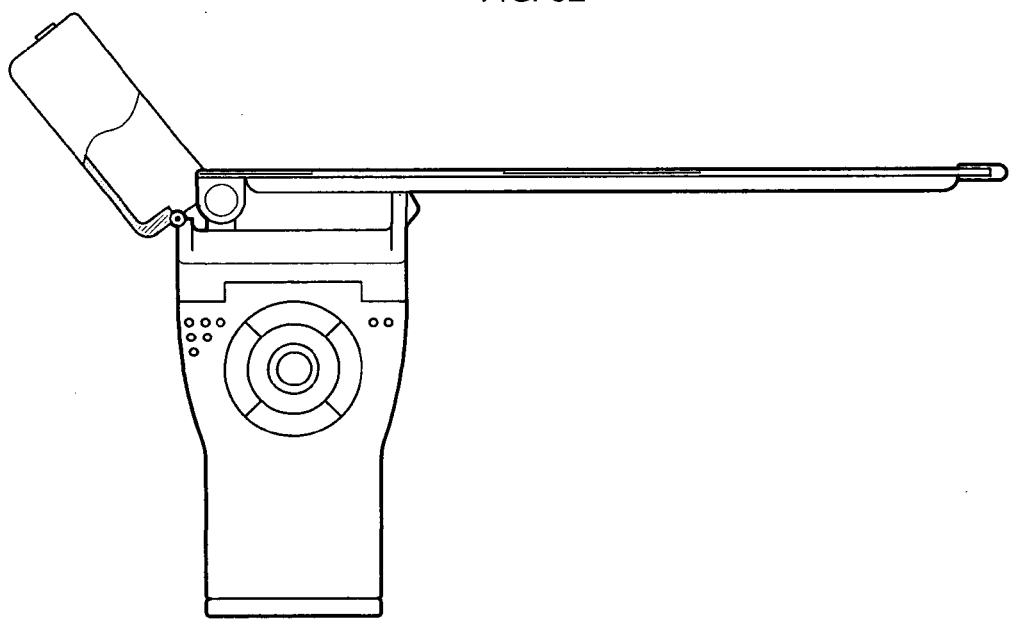
FIG. 53 shows a front view of the wrist-worn digital device with the foldable screen when the screen is fully extended.
Figure 54:
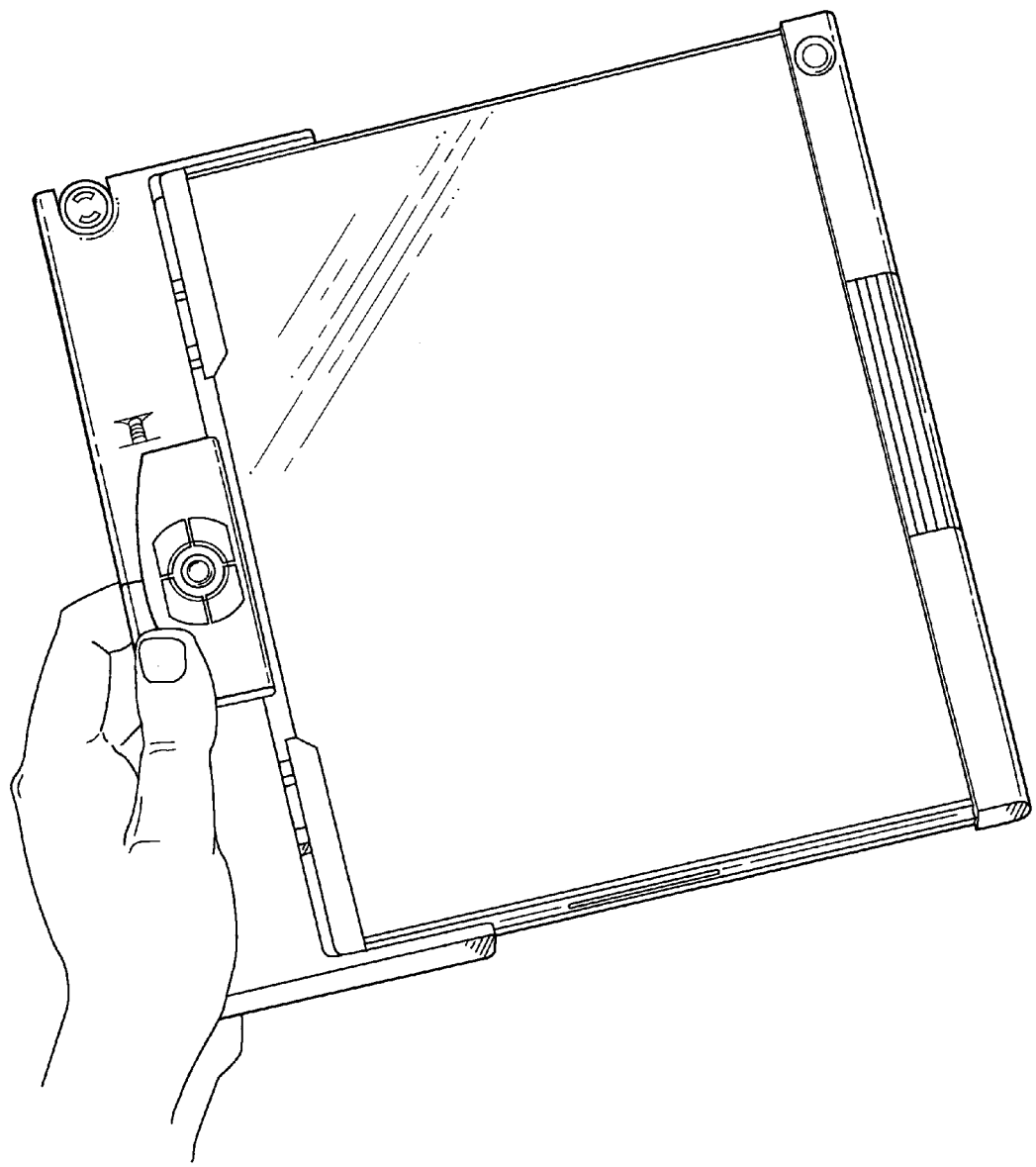
FIG. 54 shows an overall perspective view of the hand-held digital device with the foldable screen.

In the open mode the screen 10 is drawn from the top part 660 and its entire viewable area can be used to display a high volume of visual information, such as Internet pages and multimedia content (FIGS. 39, 52 and 53). To extend the screen 10, a spring-loaded cover 662 is opened, and, consequentially, the screen's bent top and bottom edges resiliently straighten (FIG. 44). Then the screen is unfolded sequentially by the user by pivoting it up and pulling it outwards (FIGS. 45, 51A and 51B). Simultaneously, the user actuates the screen's support system, which provides the necessary rigidity to the screen in the open mode (FIGS. 52 and 53). The screen 10 is enabled to display PDA-like information along with Internet content.

To return the screen 10 to its compact storage the user deactivates the screen's support system and the cables 615 and 616 are wound back by the winding mechanism 610 to pull the screen's right edge, while guiding its central part, thus making the screen 10 collapse into a plurality of substantially even folds. Now the user can pivot the folded screen 10 down and close the cover 662. The closed cover 662 presses downward on the screen's top and bottom edges to conform the screen to the inside of the top part 660 (FIG. 41). The wrist-worn digital device with foldable screen 6 returns to its closed working mode.

SECOND ALTERNATIVE EMBODIMENT

Hand-held Digital Device with Foldable Screen, FIGS. 55-67

This hand-held digital device with a foldable screen provides means to increase the viewable area of a fully open screen to such an extent that a small mobile electronic device instantly transforms into a much larger portable device, like a tablet computer, for instance.

The hand-held digital device 7 includes a body 700 that has means for wireless communication, as well as means for storing and processing information, the variable stiffness screen 10, and the audio unit 180 detachably connected to the body 700 (FIGS. 55 and 56). The body 700 consists of two housings hingeably attached to each other. Each housing includes a recessed area to accommodate the screen 10. An upper housing 720 carries the audio unit 180 and a control module 740. A lower housing 730 contains the main electronic components and the power source of the device 7 (FIGS. 55 and 56).

The screen 10 can be folded for compact storage and unfolded to make the display fully visible to the user. The proposed folding apparatus allows for folding the screen 10 sequentially in two directions perpendicular to each other. Firstly, the fully extended screen 10 is bent into a plurality of substantially even folds by means of a pullback system when the support system of the screen 10 is deactivated. The pullback system of the device 7 is substantially the same as that of the wrist-worn device 6 of the previous embodiment. Secondly, the folded screen 10 is bent transversally while being pulled by the pivoting housings of the device 7. To enable this process the screen 10 is moveably coupled to the upper housing 720 and the lower housing 730 (FIGS. 55 and 57). Also a hinge mechanism 723 of the body member 700 is designed to prevent any possible disruption to the screen's viewable area (FIGS. 55 and 57).

Figure 61:
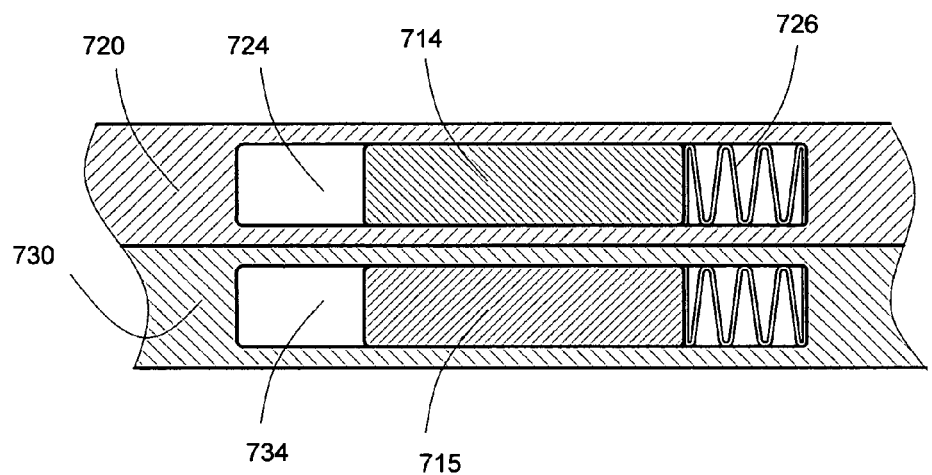
FIG. 61 shows an enlarged sectional view taken along section line 61-61 of FIG. 58 when the device is in the closed mode
Figure 62:
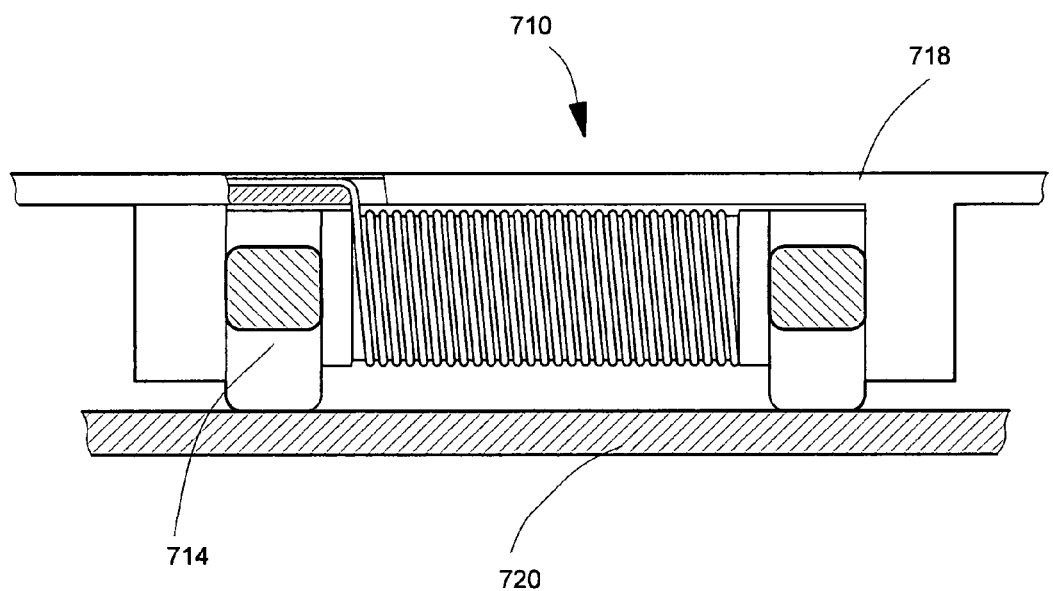
FIG. 62 shows an enlarged sectional view taken along section line 62-62 of FIG. 58.

The screen 10 is attached to the body 700 by means of a pullback winding mechanism 610, analogous to that of the wrist-worn digital device 6. In addition, to compensate for the tensile forces applied to the screen during the bending process and to preclude its apparent strain, the winding mechanism 710 is able to move between the unfolded and folded positions of the device 7 (FIGS. 56, 61 and 64). To provide this movement, the winding mechanism 710 incorporates two special support elements: a spring-loaded upper bracket 714 and a spring-loaded lower bracket 715, slidably coupled to the corresponding housings 720 and 730 (FIGS. 59 and 61).

When the user folds the device 7, the bracket 714, installed into an upper guiding channel 724 of the upper housing 720, slides inward (FIGS. 56 and 61). When the user unfolds the device 7, a built-in spring 726 pushes the bracket 714 outward enabling the screen 10 to unfold and stretch flat, thus positioning the screen 10 for its complete extension (FIG. 64). The same sequence of events simultaneously occurs in the lower housing 730 involving the lower guiding channel 734 and the bracket 715.

Figure 59A:
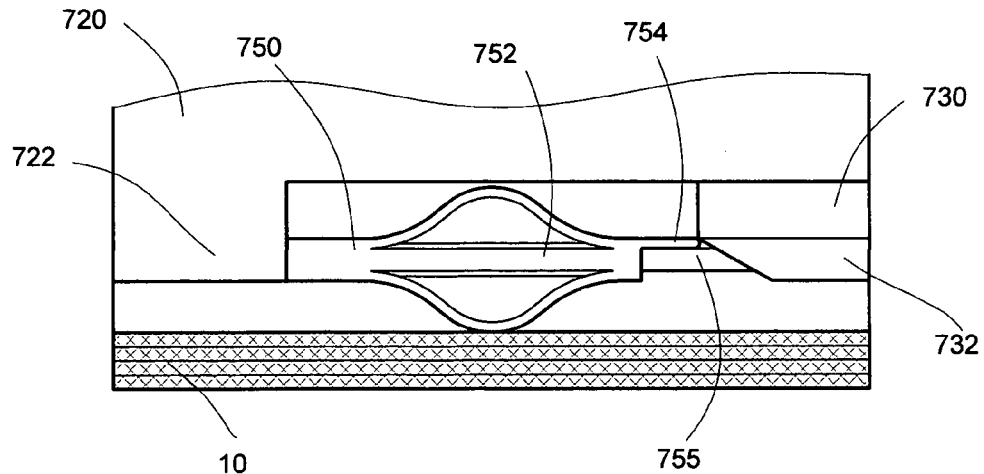
FIG. 59A shows an enlarged sectional view taken along section line 59-59 of FIG. 57 when the device is in the closed mode.
Figure 59B:
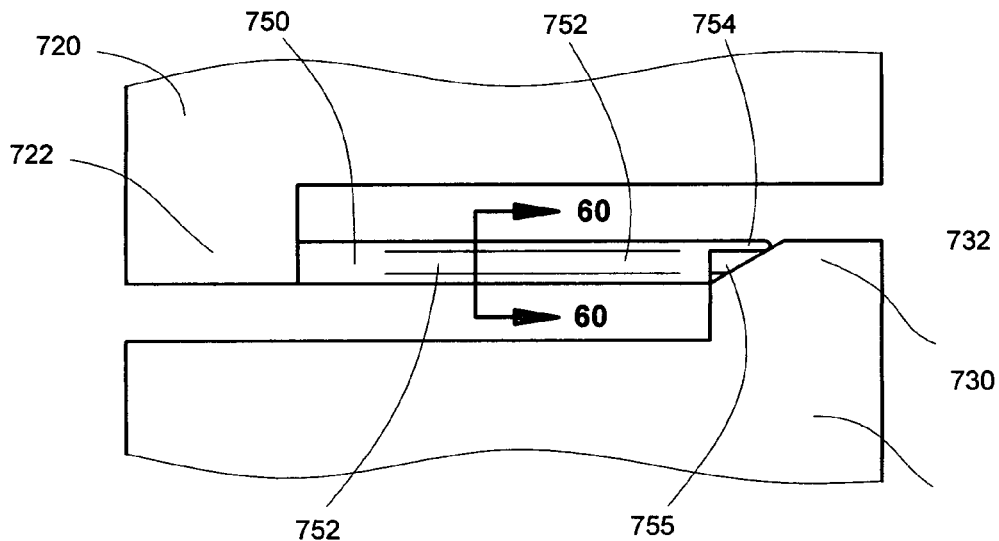
FIG. 59B shows an enlarged sectional view taken along section line 59-59 of FIG. 57 when the device is in the open mode.

To provide continuity to the screen's bending radius and to preclude formation of creases on the viewable area, the hinge mechanism 723 incorporates a tubular guide member 750 placed between a left hinge part 722 and a right hinge part 732 (FIGS. 59A and 59B). The left part 722 belongs to the device's upper housing 720, and the right part 732 is incorporated in the lower housing 730. In the central portion of the guide member 750 there are a number of evenly placed longitudinal slits that facilitate creation of an appropriate plurality of linear elements 752 among these cuts. At the right end of the guide member 750 there is a protruding element 754 with a semispherical tip. The tip is moveably engaged with the corresponding wedge-shaped edge of the hinge part 732. The guide member 750 is made from a suitable resilient material, like polypropylene, for instance.

Figure 60:
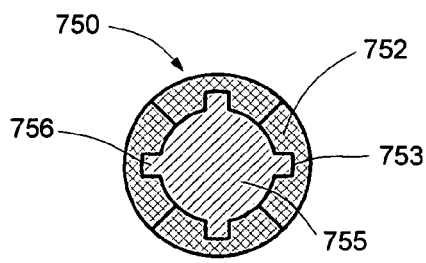
FIG. 60 shows an enlarged sectional view taken along section line 60-60 of FIG. 59B when the device is in the open mode.

When the user folds the device 7, the turning hinge part 732 pushes the right end of the guide member 750, pressed against the flat edge of the hinge part 722, inward, thus compressing it. As a result, the guide's linear elements 752 transform into curvilinear wave-like strips, where the apex of each curve serves as a support element for the bent screen 10, thus keeping the screen's bending radius substantially constant and, consequently, precluding any disruption to the screen's surface (FIGS. 57 and 59A). To prevent the guide member 750 from undesirable rotation, there is a plurality of ribs 756 on a hinge axle 755 engaging a corresponding plurality of grooves 753 on the inner wall of the guide member 750 (FIG. 60).

Figure 66:
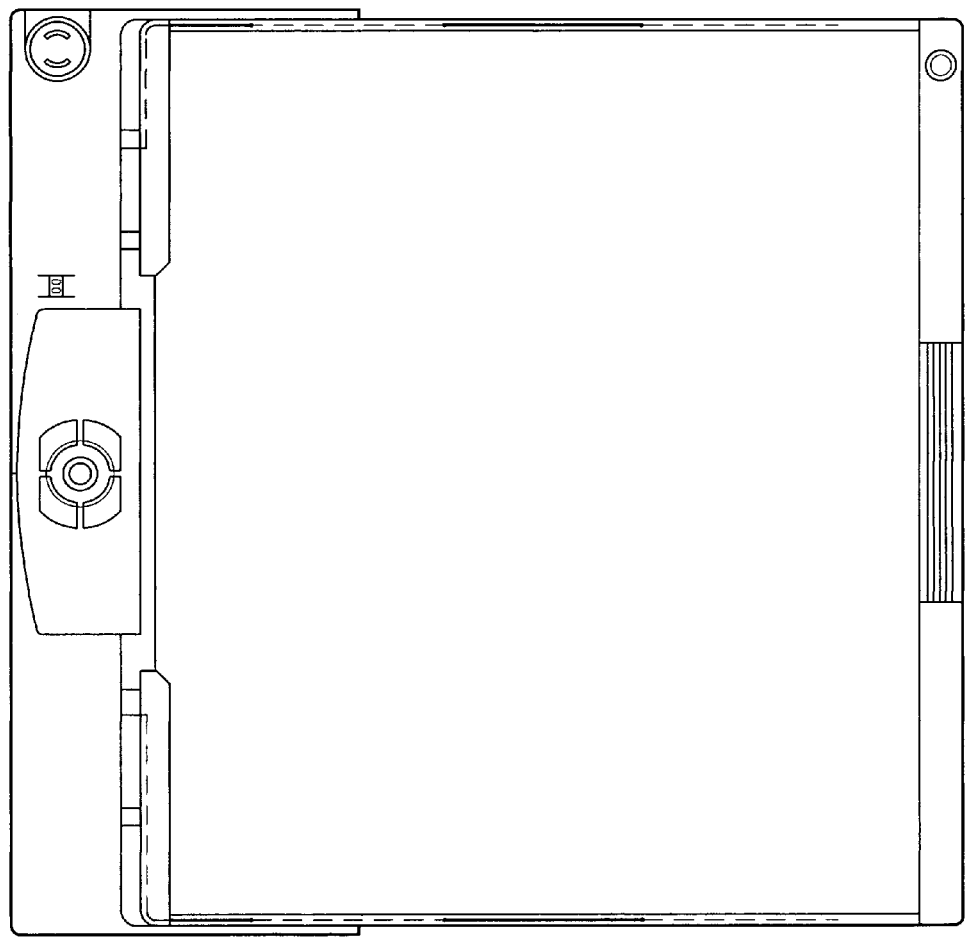
FIG. 66 shows a front view of the unfolded hand-held digital device with the foldable screen when the screen is in the fully extended mode.

The control module 740 rotates between horizontal and vertical positions (FIG. 64). When the device 7 is folded, the control module 740 is oriented horizontally, overlapping the bottom portion of the folded screen 10 (FIG. 56). A relatively small amount of visual information is enabled to display on the screen 10 in this configuration. When the device 7 is unfolded, the control module 740 rotates to its vertical orientation, making use of the screen's entire area for displaying an amount of visual information comparable to that of a tablet computer (FIGS. 64 and 66).

Figure 67:
FIG. 67 shows a top view of the unfolded hand-held digital device with the foldable screen when the screen is in the fully extended mode.

The user opens the screen 10 in a succession of two moves. First, the lower housing 730 has to be fully pivoted to align with the upper housing 720, thus forming a single flat unit (FIG. 64). This configuration allows for opening the screen 10 in the same way as it performs in the wrist-worn digital device 6. The screen 10 is unfolded sequentially by being pivoted up and pulled outwards (FIGS. 45, 51A and 51B). At the same time the user actuates the screen's support system, which provides the necessary rigidity to the screen 10 in the extended position. The screen 10 is enabled to display a significant amount of visual information along with Internet content (FIGS. 66 and 67).

CONCLUSION, RAMIFICATIONS, AND SCOPE

Accordingly, the reader will see that the personal digital device of this invention can be used as a platform for the new generation of mobile communication devices, for instance, 3G and 4G cellular phones. 3G wireless protocols allow streaming video, music and other multimedia applications, that demand high quality visual user interface. The device's immediate accessibility and adjustability define the proposed invention.

The personal digital device of this invention allows for displaying high-quality visual information, when the size of the device itself is considerably smaller than the size of its screen. Freeing a display from the obvious limitations of the device's body changes the existing relationship paradigm between the display and device itself. Therefore the miniaturization of mobile and wearable electronic devices is no longer restricted by the size of a built-in display.

The functional flexibility of the variable stiffness screen allows creation of a desirable visual interface between the user and the device. When the screen is inside, the device's overall size is quite similar to that of a conventional mobile phone and, when the screen is pulled out, it enables displaying of high-quality graphics and images comparable in viewable size to that of the screen of a hand-held device. The design of the detachable audio unit allows the user to configure the device's audio interface depending on the specifics of usage. The unit's separate configuration provides handling of video and audio information simultaneously in addition to the common advantages of hands-free communication. The proposed flexible audio and video user interface architecture could transform current mobile and wearable electronic devices into the user-centered products that can be adjusted rapidly to different requirements.

Given its compact size and unobtrusive comfortable position on the arm, the wrist-worn embodiments of the proposed digital device provide the virtually unmatched mobility and accessibility of a wristwatch. The proposed design combines the device's position on the user's wrist with the means to present information of a hand-held device.

The proposed housing's structure of a wrist-worn device with soft flexible materials coming in contact with the human body, and a rigid shell housing electronic components, can be used in a plethora of wearable electronic devices including wristwatches, medical devices, wearable computers and the like.

Although the description above contains much specificity, it should not be construed as limiting the scope of the invention, but as merely providing illustrations of some of the presently disclosed embodiments of this invention. Thus the scope of the invention should be determined by the appended claims and their legal equivalents, rather than by the examples given.

We claim:

1. A personal digital device comprising a variable stiffness screen capable of varying its display size by managing its stiffness, and a body carrying means for wireless communication and for processing information, wherein the body includes a respective holder and an audio unit with a microphone at one end and a speaker at the other end, that has a retractable earhook with a supporting mechanism allowing the user to operate said earhook automatically, while said audio unit moves in and out of said respective holder, wherein said earhook is a resilient semi-circular element with one end attached to a respective reel, and said earhook retracts by winding onto said reel, wherein said reel is driven by a tooth belt, moveably engaged with a corresponding internal stop belonging to said holder; whereby the viewable area of said screen can be adjusted depending on the volume of visual information, and correspondingly on the needs of a user, wherein the screen is connected to the body electrically and mechanically by an embedded electrical circuitry and a pull-back winding mechanism.

2. The device of claim 1, further including a flexible flat sleeve containing said screen and having a rectangular opening revealing a corresponding part of said screen, and wherein said sleeve incorporates said embedded electrical circuitry and said pullback winding mechanism to connect said screen to said body electrically and mechanically.

3. The device of claim 1, further including a rigid enclosure housing said screen and comprising a flat portion with a rectangular opening and an adjacent cylindrical portion containing a rolled-up portion of said screen; and said enclosure including said embedded electrical circuitry and said winding mechanism.

* * * * *